(12) United States Patent
Takahashi et al.

(10) Patent No.: US 10,217,971 B2
(45) Date of Patent: Feb. 26, 2019

(54) POWER STORAGE UNIT AND ELECTRONIC DEVICE

(71) Applicant: SEMICONDUCTOR ENERGY LABORATORY CO., LTD., Atsugi-shi, Kanagawa-ken (JP)

(72) Inventors: Minoru Takahashi, Nagano (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 145 days.

(21) Appl. No.: 14/558,795

(22) Filed: Dec. 3, 2014

(65) Prior Publication Data
US 2015/0155528 A1 Jun. 4, 2015

(30) Foreign Application Priority Data

Dec. 4, 2013 (JP) .................. 2013-251373

(51) Int. Cl.
*H01M 2/02* (2006.01)
*H01G 11/78* (2013.01)
(Continued)

(52) U.S. Cl.
CPC .......... *H01M 2/0202* (2013.01); *H01G 11/06* (2013.01); *H01G 11/78* (2013.01); *H01M 2/024* (2013.01); *H01M 2/0275* (2013.01); *H01M 2/0287* (2013.01); *H01M 10/052* (2013.01); *H01M 2002/0205* (2013.01); *Y02E 60/13* (2013.01); *Y02T 10/7022* (2013.01)

(58) Field of Classification Search
None
See application file for complete search history.

(56) References Cited

U.S. PATENT DOCUMENTS 6,145,280 A * 11/2000 Daroux ............... H01M 2/0275
29/623.2
7,803,483 B2 9/2010 Takami et al.
(Continued)

FOREIGN PATENT DOCUMENTS

CN 101194385 A 6/2008
CN 102959760 A 3/2013
(Continued)

OTHER PUBLICATIONS

Sundaram et al., "Electrochemical Modification of Graphene", Adv. Mater. (Advanced Materials), Aug. 18, 2008, vol. 20, No. 16, pp. 3050-3053.
(Continued)

*Primary Examiner* — Scott J. Chmielecki
(74) *Attorney, Agent, or Firm* — Nixon Peabody LLP; Jeffrey L. Costellia

(57) ABSTRACT

A power storage unit or the like which has flexibility is achieved. An exterior body has projections and depressions. For example, part of the exterior body has projections and depressions in a wave cross-sectional shape. The shape of the projections and depressions is not limited to a shape with a curve and may be a shape with a straight line, such as a rectangle wave shape or a triangle wave shape. The projections and depressions allows the exterior body to be easily shrunk on the inner side of a bend portion and easily stretched on the outer side of the bend portion.

21 Claims, 27 Drawing Sheets

(51) Int. Cl.
*H01G 11/06* (2013.01)
*H01M 10/052* (2010.01)

(56) References Cited

U.S. PATENT DOCUMENTS

| | | | |
|---|---|---|---|
| 8,785,030 | B2 | 7/2014 | Ueda |
| 9,343,716 | B2 | 5/2016 | Rothkopf et al. |
| 2010/0081049 | A1 | 4/2010 | Holl et al. |
| 2010/0081057 | A1 | 4/2010 | Liu et al. |
| 2010/0301279 | A1 | 12/2010 | Nesper et al. |
| 2010/0303706 | A1 | 12/2010 | Wallace et al. |
| 2011/0121240 | A1 | 5/2011 | Amine et al. |
| 2011/0227000 | A1 | 9/2011 | Ruoff et al. |
| 2011/0262785 | A1* | 10/2011 | Johnson ............... H01M 2/1077 429/66 |
| 2011/0294009 | A1 | 12/2011 | Kawakami et al. |
| 2013/0101884 | A1* | 4/2013 | Ueda .................... H01M 10/052 429/127 |
| 2013/0134051 | A1 | 5/2013 | Takahashi et al. |
| 2013/0171490 | A1 | 7/2013 | Rothkopf et al. |
| 2013/0196214 | A1* | 8/2013 | Scott ..................... H01M 2/022 429/174 |
| 2013/0224562 | A1* | 8/2013 | Momo ............... H01M 10/0436 429/149 |
| 2014/0063719 | A1 | 3/2014 | Yamazaki et al. |
| 2015/0022957 | A1 | 1/2015 | Hiroki et al. |
| 2016/0260945 | A1 | 9/2016 | Rothkopf et al. |

FOREIGN PATENT DOCUMENTS

| | | | |
|---|---|---|---|
| CN | 103959480 | A | 7/2014 |
| CN | 106098971 | A | 11/2016 |
| EP | 2761672 | A | 8/2014 |
| JP | 2000-173559 | A | 6/2000 |
| JP | 2001-332752 | A | 11/2001 |
| JP | 2007-018881 | A | 1/2007 |
| JP | 2007-123081 | | 5/2007 |
| JP | 2011-500488 | | 1/2011 |
| JP | 2012-009418 | | 1/2012 |
| JP | 2015-507814 | | 3/2015 |
| KR | 2014-0105447 | A | 9/2014 |
| KR | 2016-0078508 | A | 7/2016 |
| TW | 201327982 | | 7/2013 |
| WO | WO-2012/140709 | | 10/2012 |
| WO | WO-2013/101316 | | 7/2013 |

OTHER PUBLICATIONS

Zhou et al., "Controlled Synthesis of Large-Area and Patterned Electrochemically Reduced Graphene Oxide Films", Chemistry A European Journal, Jun. 15, 2009, vol. 15, No. 25, pp. 6116-6120.
Shao et al., "Facile and Controllable Electrochemical Reduction of Graphene Oxide and Its Applications", Journal of Materials Chemistry, 2010, vol. 20, pp. 743-748.
Chinese Office Action (Application No. 201410725983.5) dated Mar. 28, 2018.

* cited by examiner

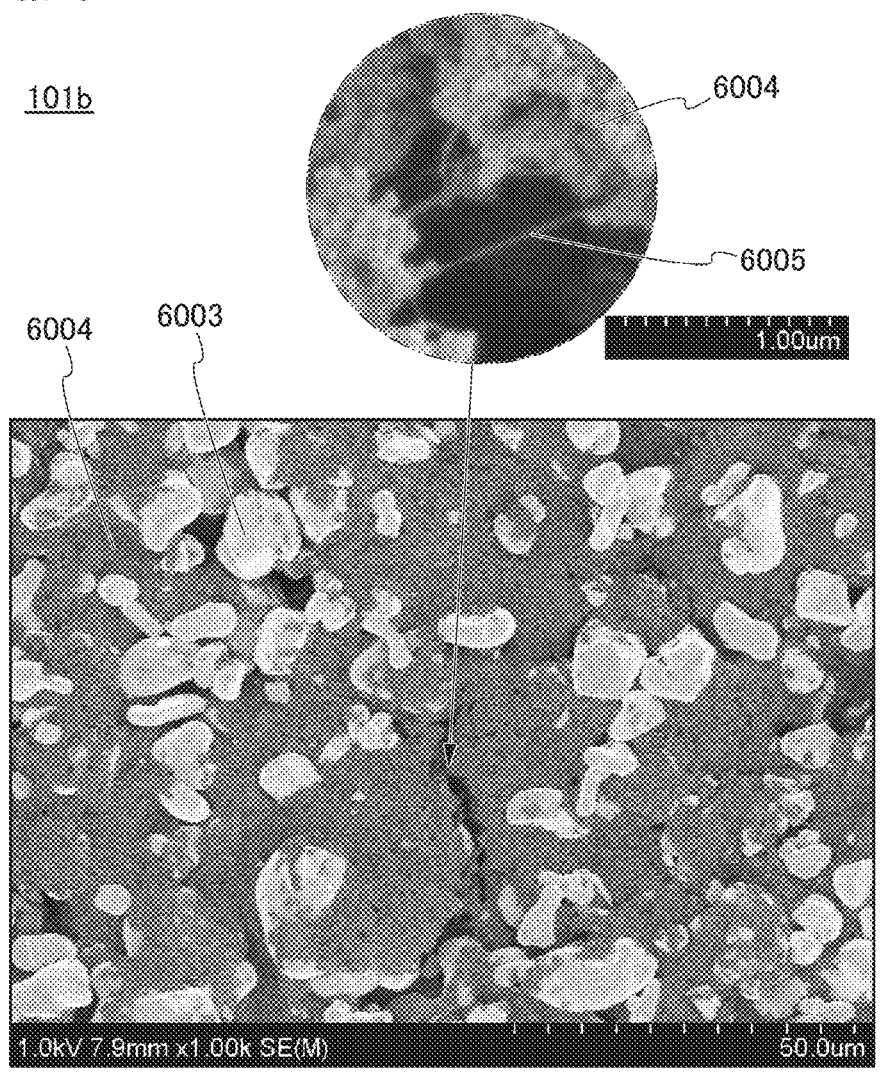

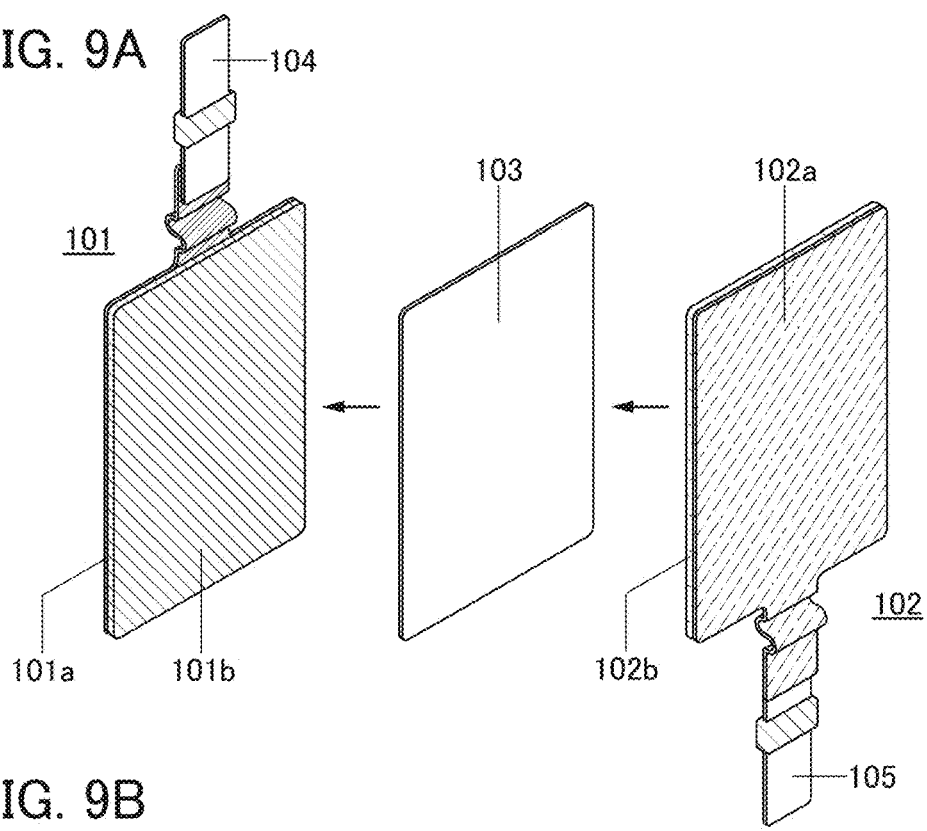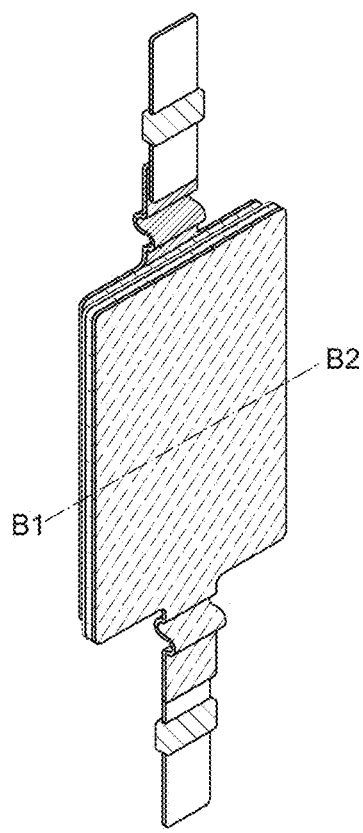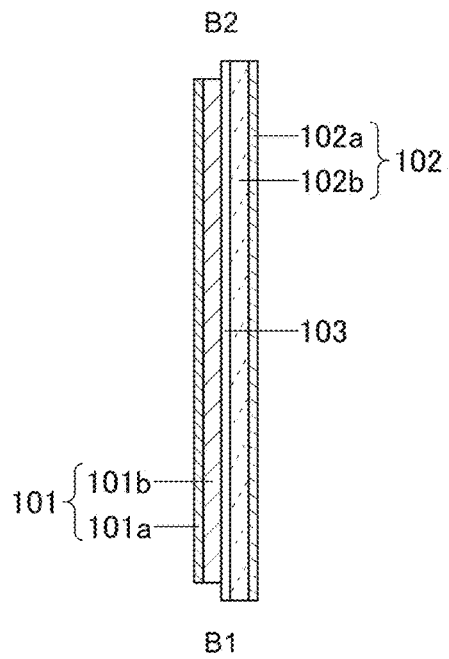

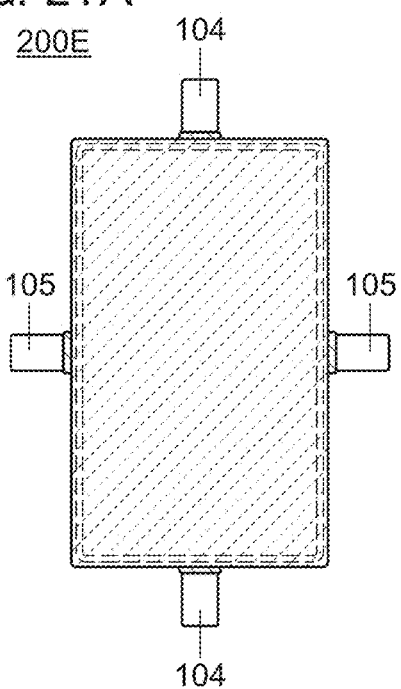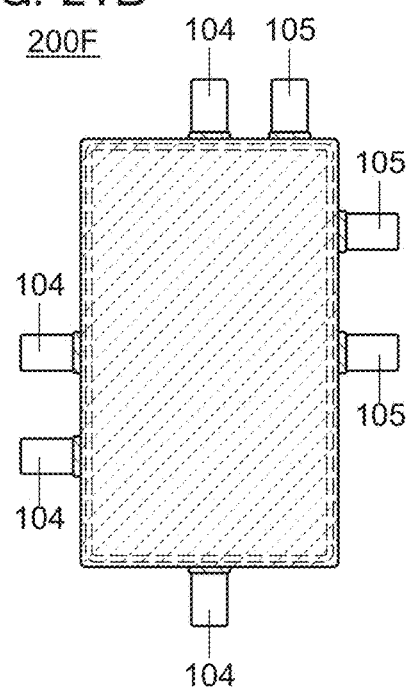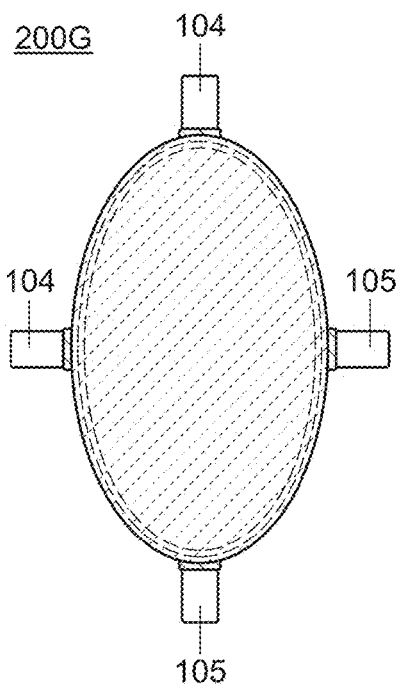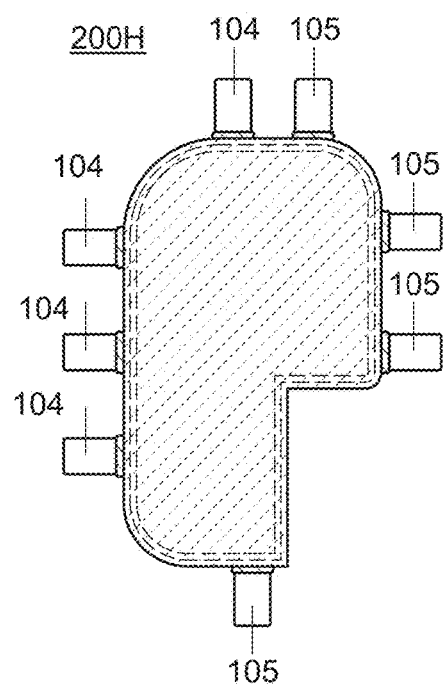

POWER STORAGE UNIT AND ELECTRONIC DEVICE

BACKGROUND OF THE INVENTION

1. Field of the Invention

One embodiment of the present invention relates to a power storage unit and a manufacturing method thereof.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them. One embodiment of the present invention particularly relates to a power storage unit and a manufacturing method thereof.

Note that in this specification, the power storage unit is a collective term describing units and devices having a power storage function. Examples of the power storage unit are batteries, primary batteries, secondary batteries, lithium-ion secondary batteries, lithium air secondary batteries, capacitors, lithium-ion capacitors, and the like. Also in this specification, the electrochemical device is a collective term describing devices that can function using a power storage unit, a conductive layer, a resistor, a capacitor, and the like. A power storage unit according to one embodiment of the present invention may be included in an electronic device, an electric device, a mechanical device, and the like.

2. Description of the Related Art

In recent years, a variety of power storage units, for example, secondary batteries such as lithium-ion secondary batteries, lithium-ion capacitors, and air batteries, have been actively developed. In particular, demand for lithium-ion secondary batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance required for the lithium-ion batteries includes increased energy density, improved cycle characteristics, safe operation under a variety of environments, and longer-term reliability.

Also in recent years, flexible display devices have been proposed to be mounted on a curved surface or worn on the human body such as head. This has increased demand for flexible power storage units that can be attached to a curved surface.

For example, a lithium-ion battery includes at least a positive electrode, a negative electrode, and an electrolyte solution (Patent Document 1).

REFERENCE

Patent Document

[Patent Document] Japanese Published Patent Application No. 2012-009418

SUMMARY OF THE INVENTION

An object of one embodiment of the present invention is to provide a power storage unit or the like which has flexibility. Another object is to provide a power storage unit or the like which is easy to bend and stretch. Another object is to provide a power storage unit or the like which has excellent flexibility. Another object is to provide a power storage unit or the like which is unlikely to be damaged. Another object is to provide a power storage unit or the like in which a defect is unlikely to occur. Another object is to provide a highly reliable power storage unit or the like. Another object is to provide a novel power storage unit or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a power storage unit which includes a positive electrode, a negative electrode, a separator, and an electrolyte solution in an exterior body having a surface at least part of which includes alternating projections and depressions. A cross-sectional shape of the projections and depressions of the exterior body is a wave shape.

At least part of the cross-sectional shape of the projections and depressions of the exterior body can include a curve and/or a straight line.

By using an exterior body having a surface at least part of which includes alternating projections and depressions as the exterior body of the power storage unit, the exterior body has increased flexibility.

A power storage unit or the like which has flexibility can be achieved. A power storage unit or the like which is easy to bend and stretch can be achieved. A power storage unit or the like which has excellent flexibility can be achieved. A power storage unit or the like which is less likely to be damaged can be achieved. A highly reliable power storage unit or the like can be achieved. Alternatively, a novel power storage unit or the like can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 5 shows an example of a positive electrode active material;

FIGS. 9A to 9C illustrate an example of a method of manufacturing a power storage unit;

FIGS. 21A to 21D illustrate examples of a direction in which a lead terminal is withdrawn;

DETAILED DESCRIPTION OF THE INVENTION

Embodiments of the present invention will be described below in detail with reference to the drawings. Note that the present invention is not limited to the following description, and it is easily understood by those skilled in the art that modes and details disclosed herein can be modified in various ways. Further, the present invention is not construed as being limited to description of the embodiments.

Note that in each drawing referred to in this specification, the size of each component or the thickness of each layer might be exaggerated or a region might be omitted for clarity of the invention. Therefore, embodiments of the present invention are not limited to such a scale.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components.

In the specification and the like, the term "parallel" indicates that, for example, the angle formed between two straight lines is greater than or equal to −10° and less than or equal to 10°, and accordingly also includes the case where the angle is greater than or equal to −5° and less than or equal to 5°. In addition, the terms "perpendicular" and "orthogonal" indicate that, for example, the angle formed between two straight lines is greater than or equal to 80° and less than or equal to 100°, and accordingly also include the case where the angle is greater than or equal to 85° and less than or equal to 95°.

In the specification and the like, the terms "identical", "the same", "equal", "uniform", and the like used in describing calculation values and actual measurement values allow for a margin of error of ±20% unless otherwise specified.

Embodiment 1

Figure 1A:
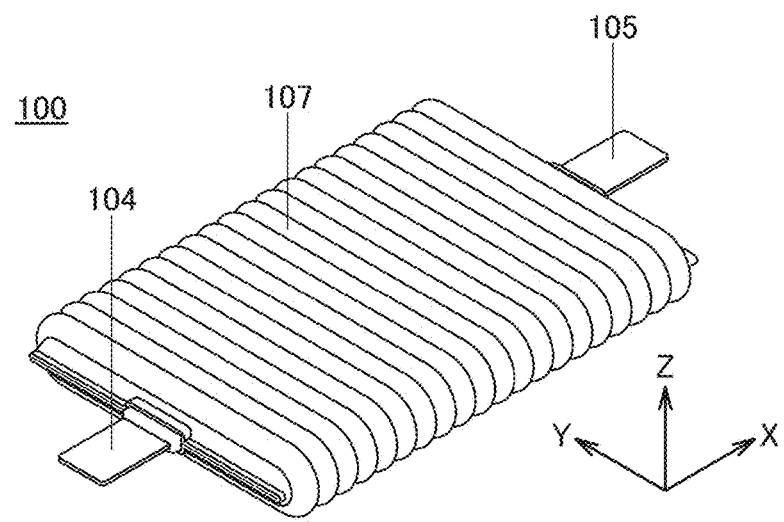
FIGS. 1A and 1B illustrate an example of a power storage unit.
Figure 1B:
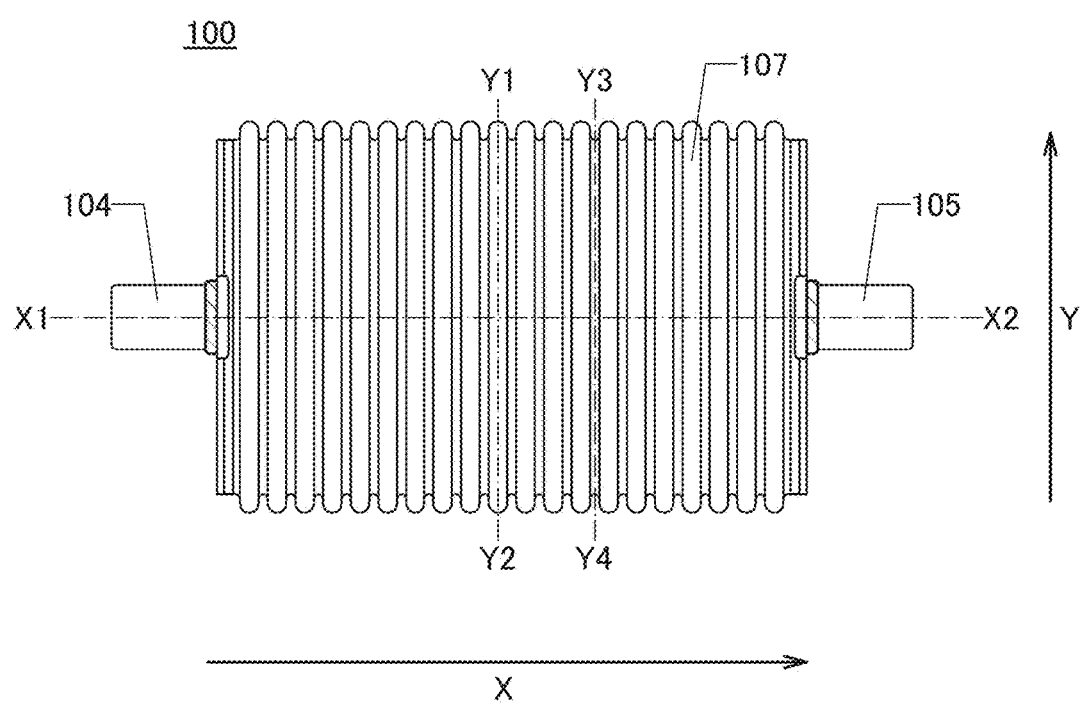
Figure 2A:
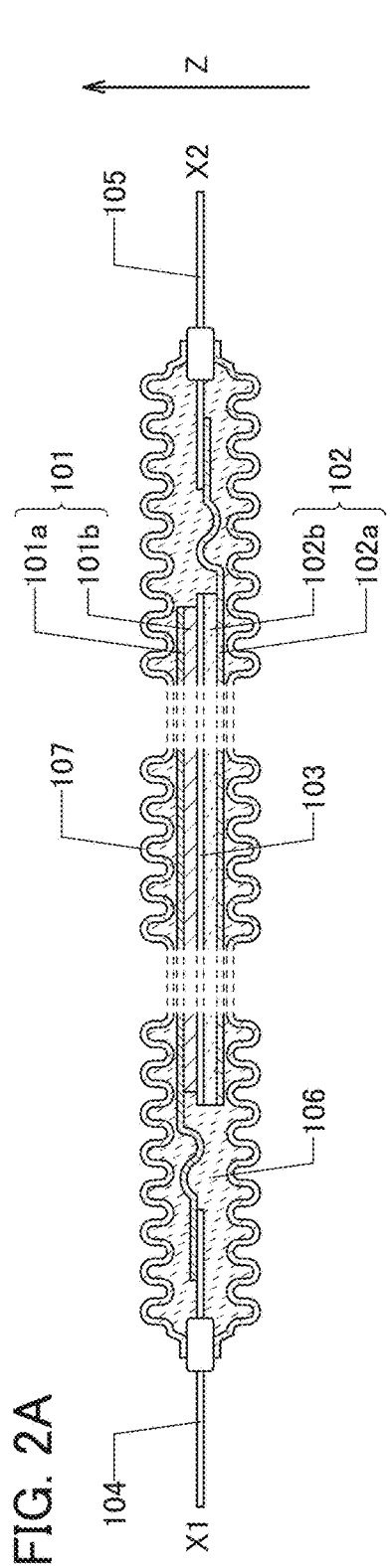
FIGS. 2A to 2D illustrate cross-sectional shapes of the power storage unit.
Figure 2B:
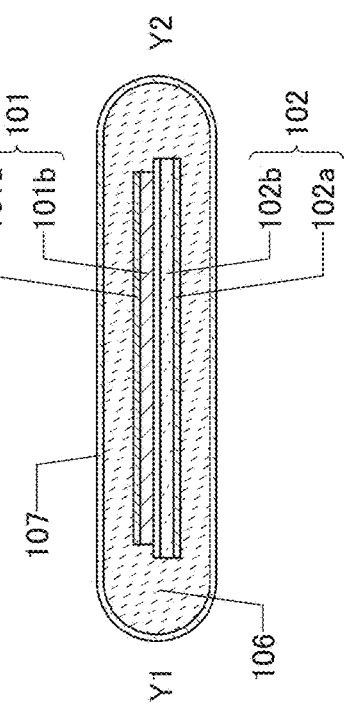
Figure 2C:
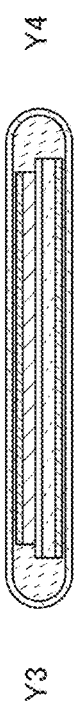

A structural example of a power storage unit 100 of one embodiment of the present invention is described with reference to drawings. FIG. 1A is a perspective view showing an appearance of the power storage unit 100. In FIG. 1A, arrows indicating the X-axis direction, the Y-axis direction, and the Z-axis direction are illustrated. The X-axis direction, the Y-axis direction, and the Z-axis direction are orthogonal to each other. FIG. 1B is a top view of the power storage unit 100. FIG. 2A is a cross-sectional view of FIG. 1B taken along the dash-dot line X1-X2, which is parallel to the X-axis direction. FIG. 2B is a cross-sectional view of FIG. 1B taken along the dash-dot line Y1-Y2, which is parallel to the Y-axis direction. FIG. 2C is a cross-sectional view of FIG. 1B taken along the dash-dot line Y3-Y4, which is parallel to the Y-axis direction.

The power storage unit 100 of one embodiment of the present invention includes, in an exterior body 107, a positive electrode 101 including a positive electrode current collector 101a and a positive electrode active material layer 101b, a separator 103, a negative electrode 102 including a negative electrode current collector 102a and a negative electrode active material layer 102b, and an electrolyte solution 106. In this embodiment, an example in which a pair of the positive electrode 101 and the negative electrode 102 is stored in the exterior body is given for simple description. However, a plurality of pairs of the positive electrode 101 and the negative electrode 102 may be stored in the exterior body in order to increase the capacity of the power storage unit. The positive electrode 101 is electrically connected to a positive electrode lead 104. The negative electrode 102 is electrically connected to a negative electrode lead 105. Each of the positive electrode lead 104 and the negative electrode lead 105 is also referred to as a lead electrode or a lead terminal. Part of the positive electrode lead 104 and part of the negative electrode lead 105 are placed outside the exterior body. The power storage unit 100 is charged and discharged through the positive electrode lead 104 and the negative electrode lead 105.

Note that although the plate-shaped separator 103 is interposed between the positive electrode 101 and the negative electrode 102 in FIGS. 2A to 2D, one embodiment of the present invention is not limited to this structure. For example, at least one of the positive electrode 101 and the negative electrode 102 may be covered with the bag-shaped separator 103.

Figure 2D:
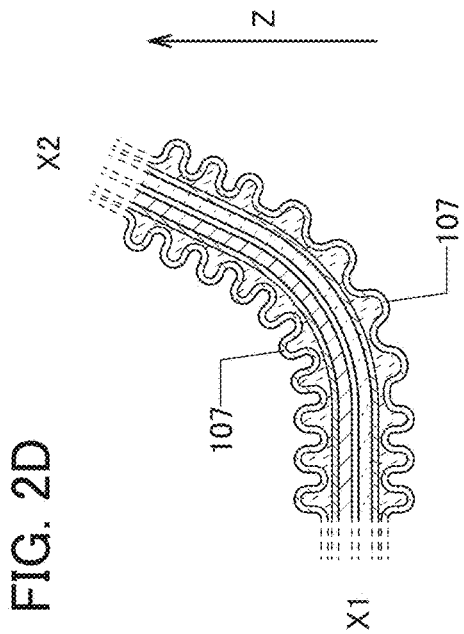

In the power storage unit 100 of one embodiment of the present invention, the exterior body 107 has projections and depressions like bellows. FIG. 2D is an enlarged cross-sectional view of a bend portion at the time when the power storage unit 100 is bent in the Z-axis direction. With the structure in which the exterior body 107 has projections and depressions like bellows (hereinafter, also referred to as a "bellows structure"), the exterior body 107 can be easily shrunk on the inner side of the bend portion and can be easily stretched on the outer side of the bend portion. The bellows structure of the exterior body 107 enables the power storage unit 100 to have excellent flexibility.

Although the exterior body 107 has projections and depressions alternating in the X-axis direction in FIGS. 1A and 1B and FIGS. 2A to 2D, one embodiment of the present invention is not limited to this structure. For example, the exterior body 107 may have projections and depressions alternating only in the Y-axis direction or may have projections and depressions alternating in both the X-axis direction and the Y-axis direction.

Figure 3:
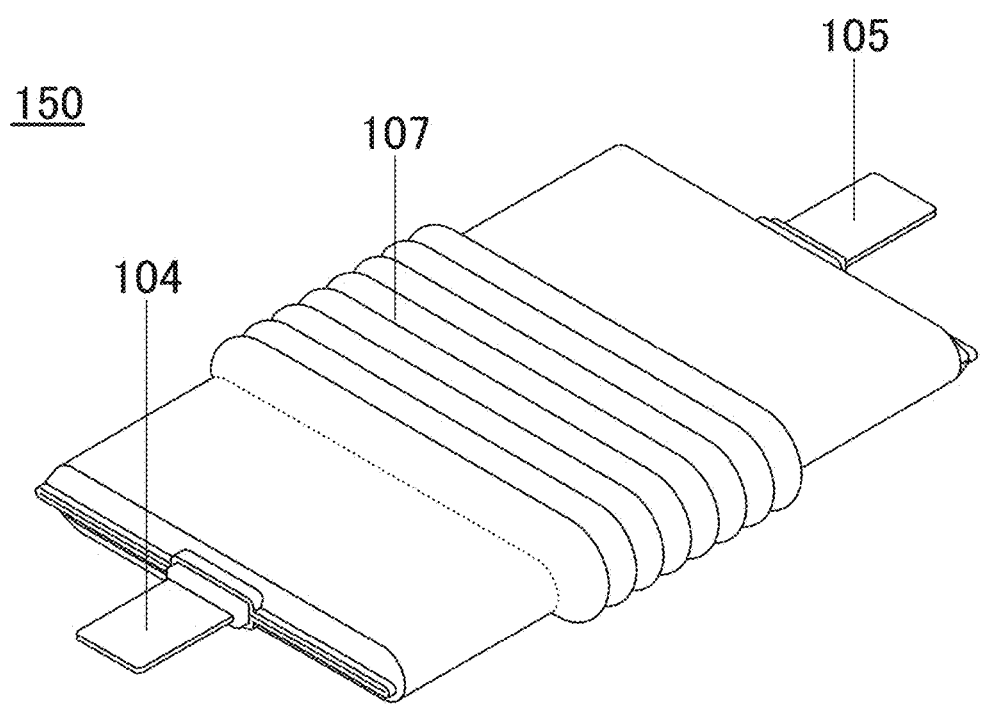
FIG. 3 illustrates an example of a power storage unit.

When the position of a bend in the power storage unit 100 is determined, the exterior body 107 only part of which has a bellows structure is possible. As an example, an external perspective view of a power storage unit 150 in which part of the exterior body 107 has a bellows structure is illustrated in FIG. 3.

The radius of curvature of the power storage unit of one embodiment of the present invention can be 30 mm or less, preferably 10 mm or less when the power storage unit is bent. The exterior body of the power storage unit is formed of one film or two films. When bent, the power storage unit has a structure in which the positive electrode 101 and the negative electrode 102 are surrounded by two curves of the film or films of the exterior body in a cross section.

Figure 22A:
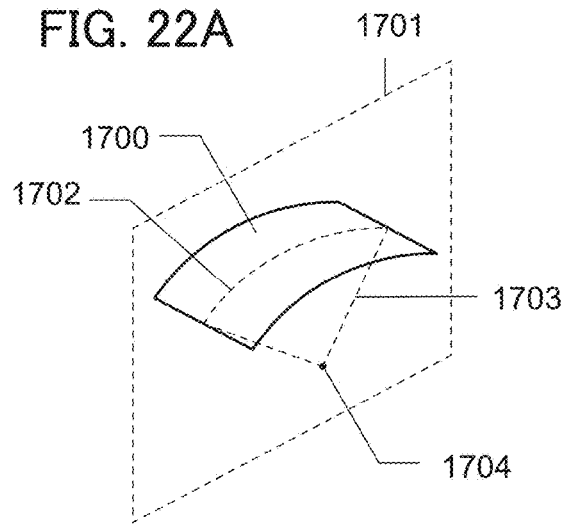
FIGS. 22A to 22C illustrate a radius of curvature of a surface.
Figure 22B:
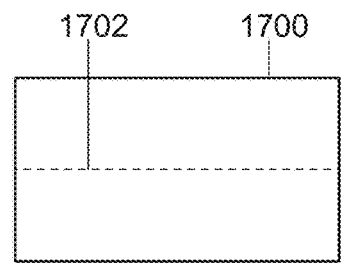
Figure 22C:
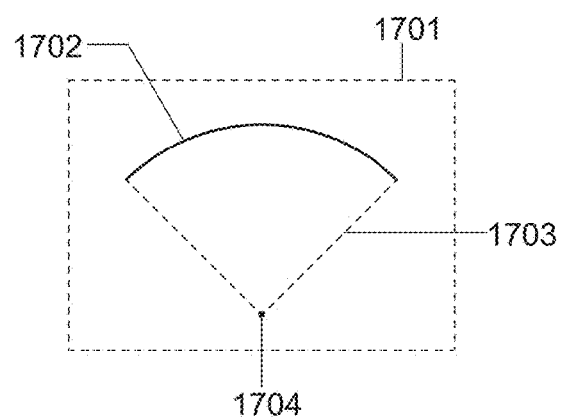

Here, the radius of curvature of a surface is described using FIGS. 22A to 22C. In FIG. 22A, on a plane 1701 by which a curved surface 1700 is cut, part of a curve 1702 forming the curved surface 1700 is made to approximate an arc of a circle. The radius of the circle is referred to as a radius 1703 of curvature, and the center of the circle is referred to as a center 1704 of curvature. FIG. 22B is a top view of the curved surface 1700, and FIG. 22C is a cross-sectional view of the curved surface 1700 cut by the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 23A:
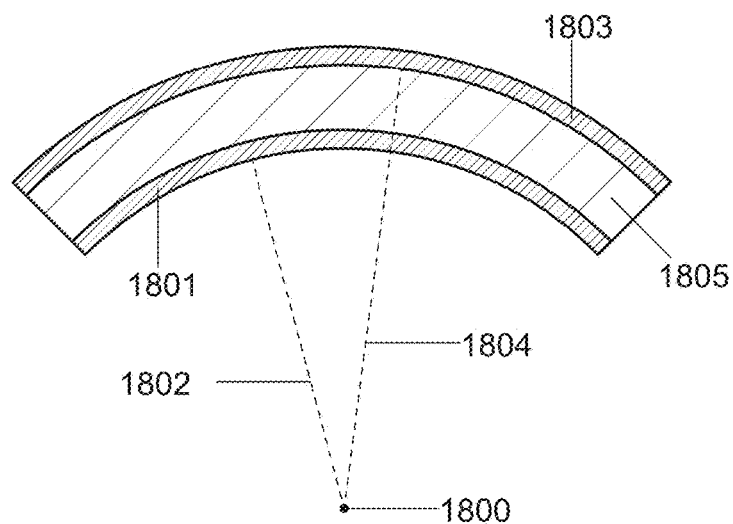
FIGS. 23A to 23D illustrate cross sections of a power storage unit.
Figure 23B:
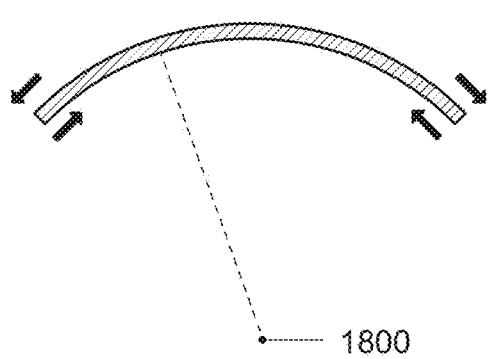

In the case of bending a power storage unit in which a battery material 1805 including electrodes, an electrolyte solution, and the like is sandwiched between two films as exterior bodies, a radius 1802 of curvature of a film 1801 closer to a center 1800 of curvature of the power storage unit is smaller than a radius 1804 of curvature of a film 1803 farther from the center 1800 of curvature (FIG. 23A). When the power storage unit is curved and has an arc-shaped cross section, compressive stress is applied to a surface of the film on the side closer to the center 1800 of curvature and tensile stress is applied to a surface of the film on the side farther from the center 1800 of curvature (FIG. 23B). Even when such compressive stress and tensile stress are applied, the projections and depressions of the exterior bodies can reduce influence of a strain to be acceptable. For this reason, the radius of curvature of the exterior body on the side closer to the center of curvature can be 30 mm or less, preferably 10 mm or less when the exterior body is bent.

Figure 23C:
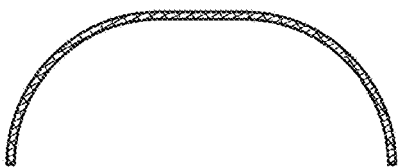
Figure 23D:

Note that the cross-sectional shape of the power storage unit is not limited to a simple arc shape, and the cross section can be partially arc-shaped; for example, a shape illustrated in FIG. 23C, a wavy shape illustrated in FIG. 23D, and an S shape can be used. When the curved surface of the power storage unit is a shape with a plurality of centers of curvature, on a curved surface with the smallest radius of curvature among radii of curvature with respect to the plurality of centers of curvature, the radius of curvature of one of the two exterior bodies on the side closer to the center of curvature can be 30 mm or less, preferably 10 mm or less.

(Structure and Manufacturing Method of Components)

Next, a structure and a manufacturing method of components of the power storage unit 100 are described.

[1. Positive Electrode]

Figure 4A:
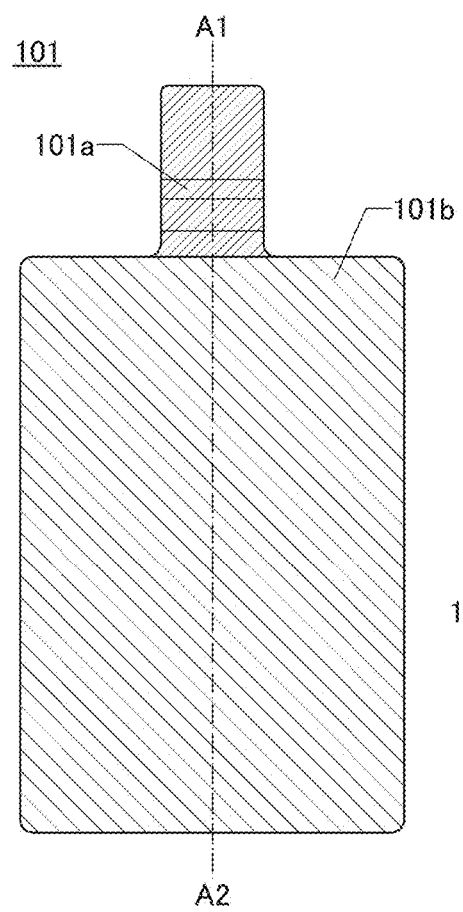
FIGS. 4A to 4C illustrate examples of a positive electrode.
Figure 4B:
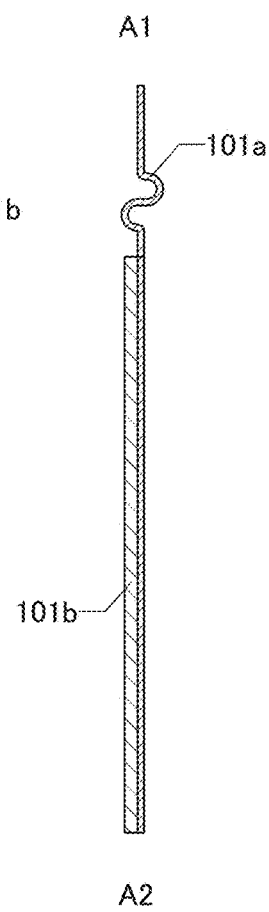
Figure 4C:
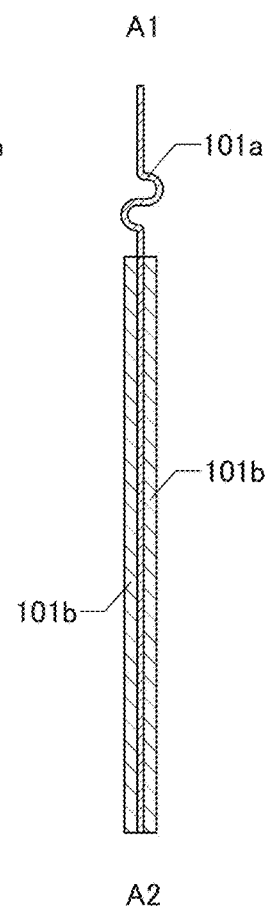

The positive electrode 101 is illustrated as an example in FIGS. 4A to 4C. FIG. 4A is a front view of the positive electrode 101, and FIGS. 4B and 4C are cross-sectional views of FIG. 4A taken along the dash-dot line A1-A2. The positive electrode 101 includes the positive electrode current collector 101a, the positive electrode active material layer 101b formed on the positive electrode current collector 101a, and the like. FIG. 4B illustrates an example in which the positive electrode active material layer 101b is provided on one surface of the sheet-shaped positive electrode current collector 101a.

FIG. 4C illustrates an example in which the positive electrode active material layer 101b is provided on each surface of the sheet-shaped positive electrode current collector 101a. Providing the positive electrode active material layer 101b on each surface of the positive electrode current collector 101a allows the power storage unit 100 to have increased charge and discharge capacity. Alternatively, it is possible to prepare two positive electrodes 101 each including the positive electrode active material layer 101b provided on one surface of the positive electrode current collector 101a, where surfaces each of which is not provided with the positive electrode active material layer 101b overlap to face each other.

Furthermore, although the positive electrode active material layer 101b may be provided on the whole positive electrode current collector 101a, the positive electrode active material layer 101b may be provided on part of the positive electrode current collector 101a. For example, the positive electrode active material layer 101b is not provided on a portion of the positive electrode current collector 101a which is to be in contact with the positive electrode lead 104 (hereinafter, the portion is also referred to as a "positive electrode tab").

The positive electrode current collector 101a can be formed using a material that has high conductivity and is not alloyed with a carrier ion such as lithium ion or the like, such as stainless steel, gold, platinum, zinc, iron, copper, aluminum, or titanium, an alloy thereof, or the like. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101a can have a foil shape, a plate shape (sheet shape), a net shape, a punching-metal shape, an expanded-metal shape, or the like as appropriate. The positive electrode current collector 101a preferably has a thickness greater than or equal to 5 μm and less than or equal to 30 μm. The surface of the positive electrode current collector 101a may be provided with an undercoat using graphite or the like.

The positive electrode active material layer 101b may further include a binder for increasing adhesion of positive electrode active materials, a conductive additive for increasing the conductivity of the positive electrode active material layer 101b, and the like in addition to the positive electrode active material.

FIG. 5 shows a photograph of a surface of the positive electrode active material layer 101b, which is observed with a scanning electron microscope (SEM). The positive electrode active material layer 101b shown in FIG. 5 includes particles of a positive electrode active material 6003, a conductive additive 6004, and a binder 6005.

The positive electrode active material 6003 is in the form of particles made of secondary particles having an average particle diameter and particle diameter distribution, which are obtained in such a way that material compounds are mixed at a predetermined ratio and baked and the resulting baked product is crushed, granulated, and classified by an appropriate means. For this reason, the shape of the positive electrode active material is not limited to that shown as an example in FIG. 5. The shape of the positive electrode active material 6003 may be a given shape such as a particle shape, a plate shape, a rod shape, a cylindrical shape, a powder shape, or a flake shape. Furthermore, the positive electrode active material 6003 may have a three-dimensional shape such as unevenness on a surface with a plate shape, fine unevenness on a surface, or a porous shape.

Examples of the positive electrode active material 6003 include a composite oxide with an olivine crystal structure, a composite oxide with a layered rock-salt crystal structure, and a composite oxide with a spinel crystal structure. As the positive electrode active material 6003, a compound such as $LiFeO_2$, $LiCoO_2$, $LiNiO_2$, $LiMn_2O_4$, $V_2O_5$, $Cr_2O_5$, and $MnO_2$ is used.

In particular, $LiCoO_2$ is preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}MO_2$ (M=Co, Al, or the like)) to a lithium-containing material with a spinel crystal structure which contains manganese such as $LiMn_2O_4$ because the elution of manganese and the decomposition of an electrolyte solution can be suppressed, for example.

Alternatively, a complex material ($LiMPO_4$ (general formula) (M is one or more of Fe(II), Mn(II), Co(II), and Ni(II))) can be used. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

In particular, $LiFePO_4$ is preferable because it properly satisfies conditions necessary for the positive electrode active material, such as safety, stability, high capacity density, high potential, and the existence of lithium ions which can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material 6003. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material 6003, for example.

In the case where carrier ions are alkali metal ions other than lithium ions or alkaline-earth metal ions, the following may be used as the positive electrode active material: an alkali metal (e.g., sodium or potassium) or an alkaline-earth metal (e.g., calcium, strontium, barium, beryllium, or magnesium). For example, the positive electrode active material 6003 may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material 6003. For example, the positive electrode active material 6003 may be a solid solution containing any of the aforementioned materials, e.g., a solid solution containing $LiCo_{1/3}Mn_{1/3}Ni_{1/3}O_2$ and $Li_2MnO_3$.

The average particle diameter of the primary particle of the positive electrode active material 6003 is preferably greater than or equal to 50 nm and less than or equal to 100 μm.

Examples of the conductive additive 6004 include acetylene black (AB), graphite (black lead) particles, carbon nanotubes, graphene, and fullerene.

A network for electron conduction can be formed in the positive electrode active material layer 101b by the conductive additive 6004. The conductive additive 6004 also allows maintaining of a path for electric conduction between the positive electrode active materials. The addition of the conductive additive 6004 to the positive electrode active material layer 101b increases the electron conductivity of the positive electrode active material layer 101b.

As the binder 6005, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder 6005 in the positive electrode active material layer 101b is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 101b is preferably greater than or equal to 1 wt % and less than or equal to 10 wt %, more preferably greater than or equal to 1 wt % and less than or equal to 5 wt %.

In the case where the positive electrode active material layer 101b is formed by a coating method, the positive electrode active material 6003, the conductive additive 6004, and the binder 6005 are mixed to form a positive electrode paste (slurry), and the positive electrode paste is applied to the positive electrode current collector 101a and dried.

[1.1. Connecting Lead Electrode to Positive Electrode]

Figure 6A:
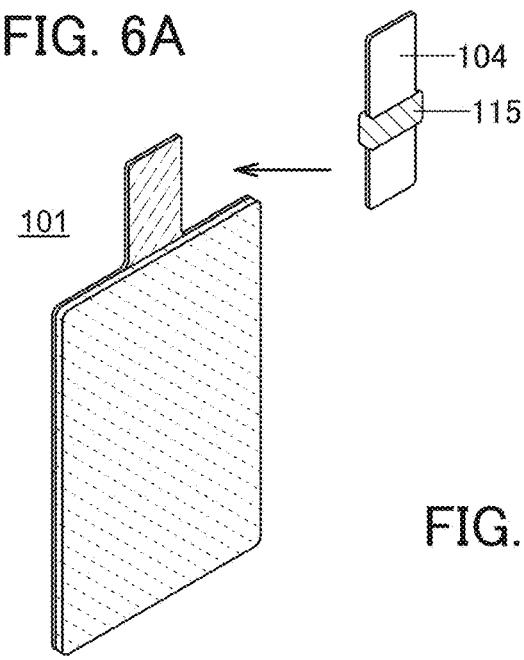
FIGS. 6A to 6D illustrate an example of a method of connecting a positive electrode lead to a positive electrode.

After the positive electrode active material layer 101b is formed on the positive electrode current collector 101a, the positive electrode lead 104 provided with a sealing layer 115 is connected to a positive electrode tab of the positive electrode current collector 101a (see FIG. 6A). The positive electrode tab and the positive electrode lead 104 are electrically connected by irradiation with ultrasonic waves with pressure applied (ultrasonic welding).

The positive electrode tab to which the positive electrode lead 104 is connected is likely to have a defect such as a crack or a cut owing to stress generated by external force applied after manufacture of the power storage unit.

Figure 6B:
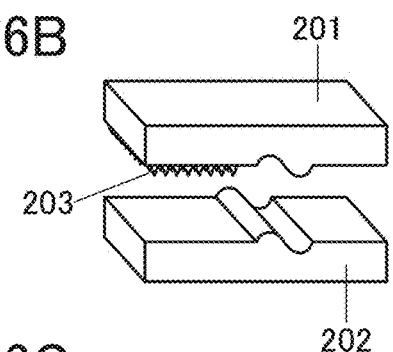

Thus, an ultrasonic welding apparatus including bonding dies illustrated in FIG. 6B is used in this embodiment. Note that only top and bottom bonding dies of the ultrasonic welding apparatus are illustrated in FIG. 6B for simplicity.

Figure 6C:
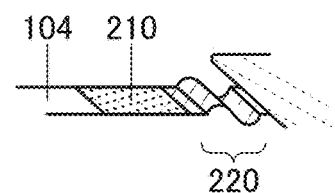

The positive electrode tab and the positive electrode lead 104 are placed between a first bonding die 201 provided with projections 203 and a second bonding die 202. When ultrasonic welding is performed with a region to be connected overlapping with the projections 203, a connection region 210 and a bend portion 220 can be formed in the positive electrode tab. FIG. 6C is a perspective view in which the connection region 210 and the bend portion 220 of the positive electrode tab are enlarged.

This bend portion 220 can relieve stress due to external force applied after manufacture of the power storage unit 100. Accordingly, the power storage unit 100 can be highly reliable.

Furthermore, the ultrasonic welding apparatus including the bonding dies illustrated in FIG. 6B can perform ultrasonic welding and form the bend portion 220 at a time; thus, a secondary battery can be manufactured without increasing the number of manufacturing steps. Note that ultrasonic welding and forming the bend portion 220 may be separately performed.

The bend portion 220 is not necessarily formed in the positive electrode tab. The positive electrode current collector may be formed using a high-strength material such as stainless steel to a thickness of 10 μm or less, in order to easily relieve stress due to external force applied after manufacture of a secondary battery.

It is needless to say that two or more of the above examples may be combined to relieve concentration of stress in the positive electrode tab.

Figure 6D:
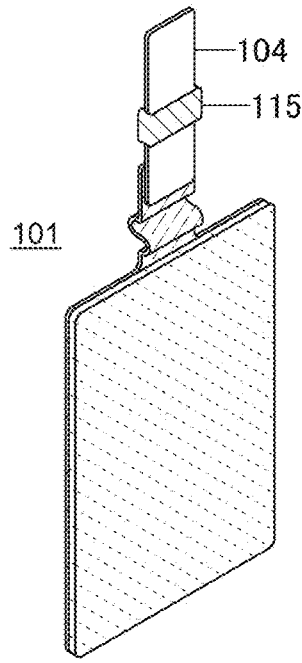

Thus, the positive electrode 101 to which the positive electrode lead 104 is connected can be fabricated (see FIG. 6D).

[2. Negative Electrode]

Figure 7A:
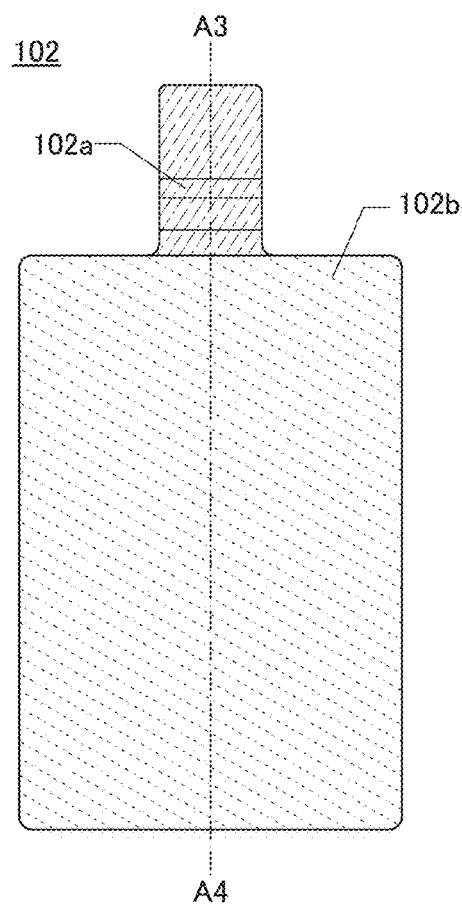
FIGS. 7A to 7C illustrate examples of a negative electrode.
Figure 7B:
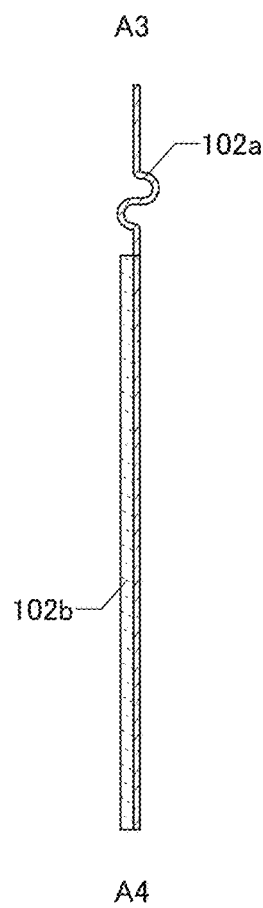
Figure 7C:
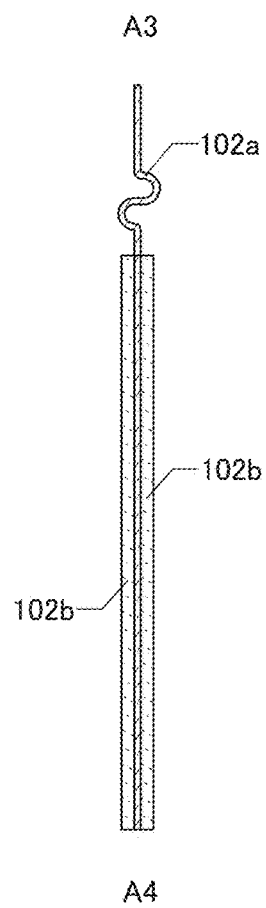

Next, an example of a negative electrode of the power storage unit is described with reference to FIGS. 7A to 7C. FIGS. 7A to 7C illustrates the negative electrode 102 as an example. FIG. 7A is a front view of the negative electrode 102, and FIGS. 7B and 7C are cross-sectional views of FIG. 7A taken along the dash-dot line A3-A4. The negative electrode 102 includes a negative electrode current collector 102a, a negative electrode active material layer 102b formed over the negative electrode current collector 102a, and the like. FIG. 7B illustrates an example in which the negative electrode active material layer 102b is provided on one surface of the sheet-shaped negative electrode current collector 102a. FIG. 7C illustrates an example in which the negative electrode active material layer 102b is provided on each surface of the sheet-shaped negative electrode current collector 102a. Providing the negative electrode active material layer 102b on each surface of the negative electrode current collector 102a allows the power storage unit 100 to have increased charge and discharge capacity. Alternatively, it is possible to prepare two negative electrodes 102 each including the negative electrode active material layer 102b provided on one surface of the negative electrode current collector 102a, where surfaces each of which is not provided with the negative electrode active material layer 102b overlap to face each other.

Furthermore, although the negative electrode active material layer 102b may be provided on the whole negative electrode current collector 102a, the negative electrode active material layer 102b may be provided on part of the negative electrode current collector 102a. For example, the negative electrode active material layer 102b is not provided on a portion of the negative electrode current collector 102a which is to be in contact with the negative electrode lead 105 (hereinafter, the portion is also referred to as a "negative electrode tab").

The negative electrode current collector 102a can be formed using a material that has high conductivity and is not alloyed with a carrier ion such as lithium ion or the like, such as stainless steel, gold, platinum, zinc, iron, copper, or titanium, an alloy thereof, or the like. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 102a can have a foil shape, a plate (sheet) shape, a net shape, a punching-metal shape, an expanded-metal shape, or the like as appropriate. The negative electrode current collector 102a preferably has a thickness greater than or equal to 5 μm and less than or equal to 30 μm. A surface of the negative electrode current collector 102a may be provided with an undercoat using graphite or the like.

Figure 8:
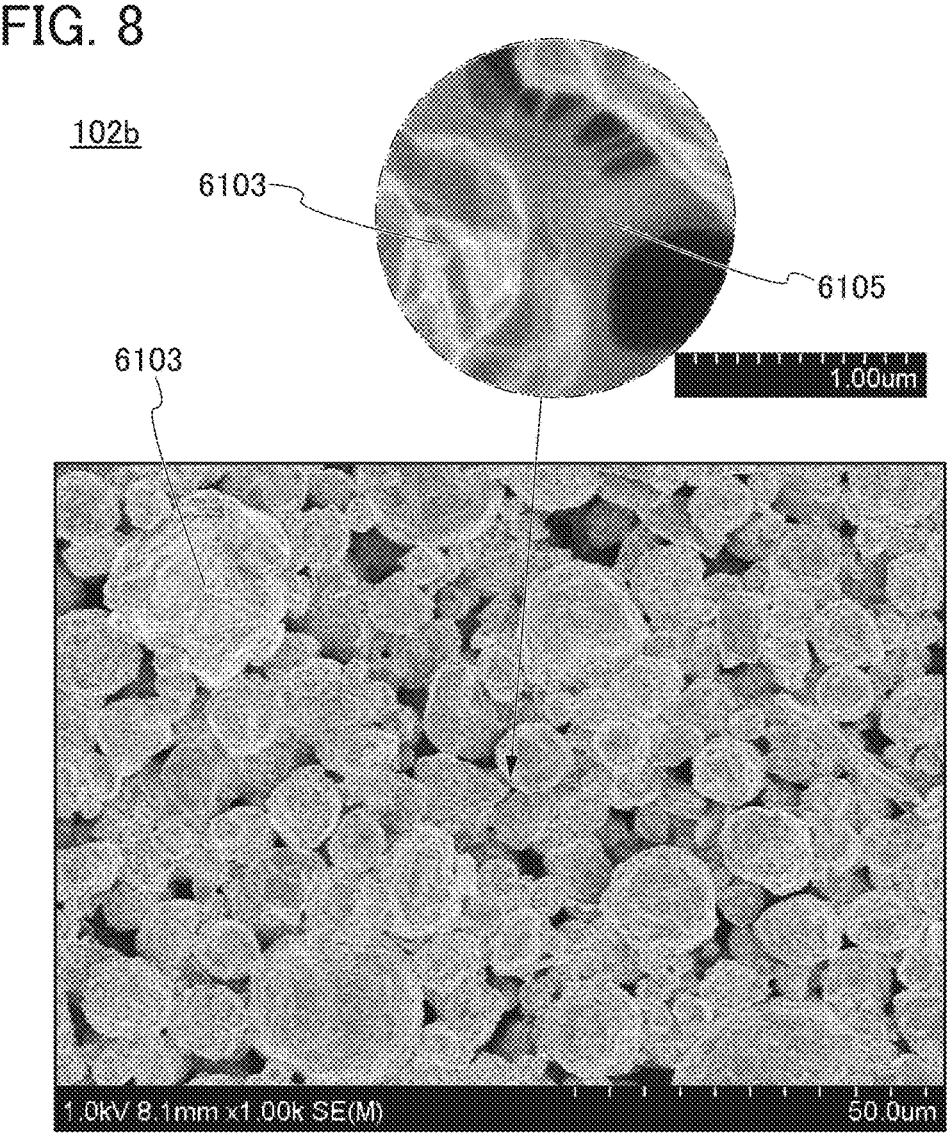
FIG. 8 shows an example of a negative electrode active material.

FIG. 8 shows a photograph of the surface of the negative electrode active material layer 102b as an example, which is observed with a scanning electron microscope. FIG. 8 shows an example in which the negative electrode active material layer 102b includes a negative electrode active material 6103 and a binder (binding agent) 6105, though a conductive additive may be added to the negative electrode active material layer 102b.

There is no particular limitation on the material of the negative electrode active layer 102b as long as it is a material with which lithium can be dissolved and precipitated or a material into/from which lithium ions can be inserted and extracted. Other than a lithium metal or lithium titanate, a carbon-based material generally used in the field of power storage, or an alloy-based material can also be used as the negative electrode active material layer 102b.

The lithium metal is preferable because of its low redox potential (3.045 V less than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium-ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables a charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, As, Sb, Bi, Ag, Au, Zn, Cd, Hg, In, and the like. Such elements have higher capacity than carbon. In particular, silicon has a theoretical capacity of 4200 mAh/g, which is significantly high. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material layer 102b, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), molybdenum oxide ($MoO_2$), or the like can be used.

Still alternatively, as the negative electrode active material layer 102b, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Still further alternatively, as the negative electrode active material layer 102b, a material which causes a conversion reaction can be used. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

In the case where the negative electrode active material layer 102b is formed on the negative electrode current collector 102a by a coating method, the negative electrode active material 6103 and the binder 6105 are mixed to form a negative electrode paste (slurry), and the negative electrode paste is applied to the negative electrode current collector 102a and dried. Note that a conductive additive may be added to the negative electrode paste.

Graphene may be formed on a surface of the negative electrode active material layer 102b. For example, in the case of using silicon as the negative electrode active material layer 102b, the volume of silicon is greatly changed due to occlusion and release of carrier ions in charge-discharge cycles. Thus, adhesion between the negative electrode current collector 102a and the negative electrode active material layer 102b is decreased, resulting in degradation of battery characteristics caused by charge and discharge. In view of this, graphene is preferably formed on a surface of the negative electrode active material layer 102b containing silicon because even when the volume of silicon is changed in charge-discharge cycles, separation between the negative electrode current collector 102a and the negative electrode active material layer 102b can be prevented, which makes it possible to reduce the degradation of battery characteristics.

Further, a coating film of an oxide or the like may be formed on the surface of the negative electrode active material layer 102b. A coating film formed by decomposition of an electrolyte solution or the like in charging cannot release electric charges used at the formation, and therefore forms irreversible capacity. In contrast, the film of an oxide or the like provided on the surface of the negative electrode active material layer 102b in advance can reduce or prevent generation of irreversible capacity.

As the coating film coating the negative electrode active material layer 102b, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits an electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 102b with the coating film, for example. The sol-gel method is a method for forming a thin film in such a manner that a solution of metal alkoxide, a metal salt, or the like is changed into a gel, which has lost its fluidity, by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 102b. A decrease in the capacity of the power storage unit can be prevented by using the coating film.

[2.1. Connecting Lead Electrode to Negative Electrode]

After the negative electrode active material layer 102b is formed on the negative electrode current collector 102a, the negative electrode lead 105 provided with the sealing layer 115 is connected to a negative electrode tab of the negative electrode current collector 102a. The negative electrode tab and the negative electrode lead 105 are connected like the positive electrode tab and the positive electrode lead 104.

[3. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

The positive electrode 101, the negative electrode 102, and the separator 103 overlap so that the separator 103 is interposed between the positive electrode 101 and the negative electrode 102. Here, the positive electrode active material layer 101*b* and the negative electrode active material layer 102*b* overlap so as to face each other. In FIG. 9A, the plate-shaped separator 103 is interposed between the positive electrode 101 and the negative electrode 102, in which the positive electrode active material layer 101*b* is formed on one side of the positive electrode current collector 101*a* in the positive electrode 101 and the negative electrode active material layer 102*b* is formed on one surface of the negative electrode current collector 102*a* in the negative electrode 102. Note that the positive electrode lead 104 and the negative electrode lead 105 are placed in different directions so as not to overlap with each other.

In addition, the separator 103 preferably has a size such that it can completely cover at least one of the positive electrode active material layer 101*b* and the negative electrode active material layer 102*b*.

FIG. 9B is a perspective view in which the positive electrode 101, the negative electrode 102, and the separator 103 overlap with each other. FIG. 9C is a cross-sectional view of FIG. 9B taken along the dash-dot line B1-B2. The negative electrode 102 larger than the positive electrode 101 is overlapped here, but the negative electrode 102 smaller than the positive electrode 101 may be overlapped. Alternatively, the positive electrode 101 and the negative electrode 102 having the same size may overlap with each other.

Figure 10A:
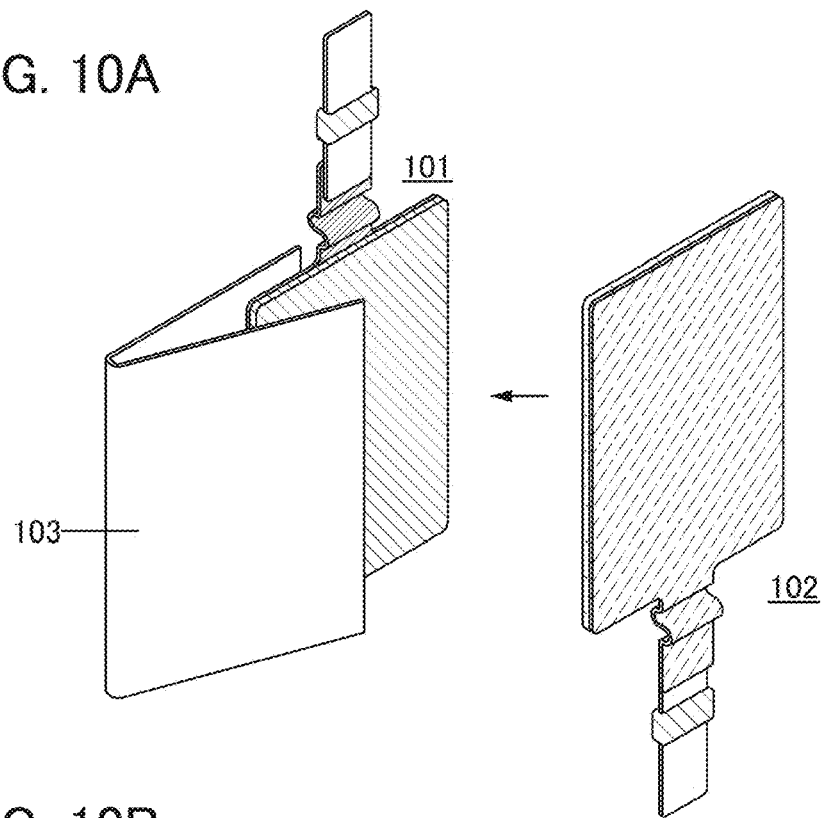
FIGS. 10A to 10C illustrate an example of a method of manufacturing a power storage unit.

The shape of the separator 103 is not limited to a sheet shape. For example, the separator 103 which is folded double may be used, in which case one or both of the positive electrode 101 and the negative electrode 102 may be placed inside the double-folded separator 103. In FIG. 10A, the positive electrode 101 is placed inside the double-folded separator 103 and then overlaps with the negative electrode 102.

Figure 10B:
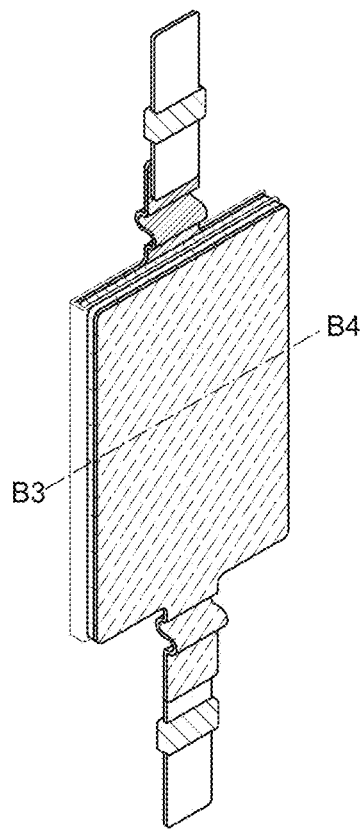
Figure 10C:
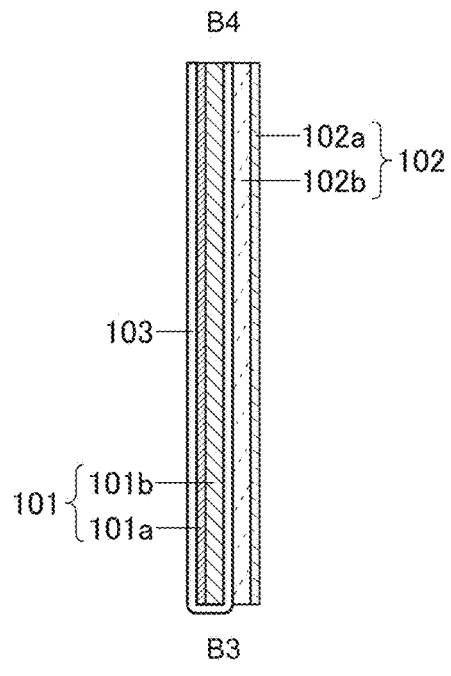

FIG. 10B is a perspective view in which the positive electrode 101 placed inside the double-folded separator 103 and the negative electrode 102 overlap with each other. FIG. 10C is a cross-sectional view of FIG. 10B taken along the dash-dot line B3-B4. Although the positive electrode 101 and the negative electrode 102 having the same size overlap here, they may have different sizes. The double-folded separator 103 can be used for one or both of the positive electrode 101 and the negative electrode 102.

Figure 11:
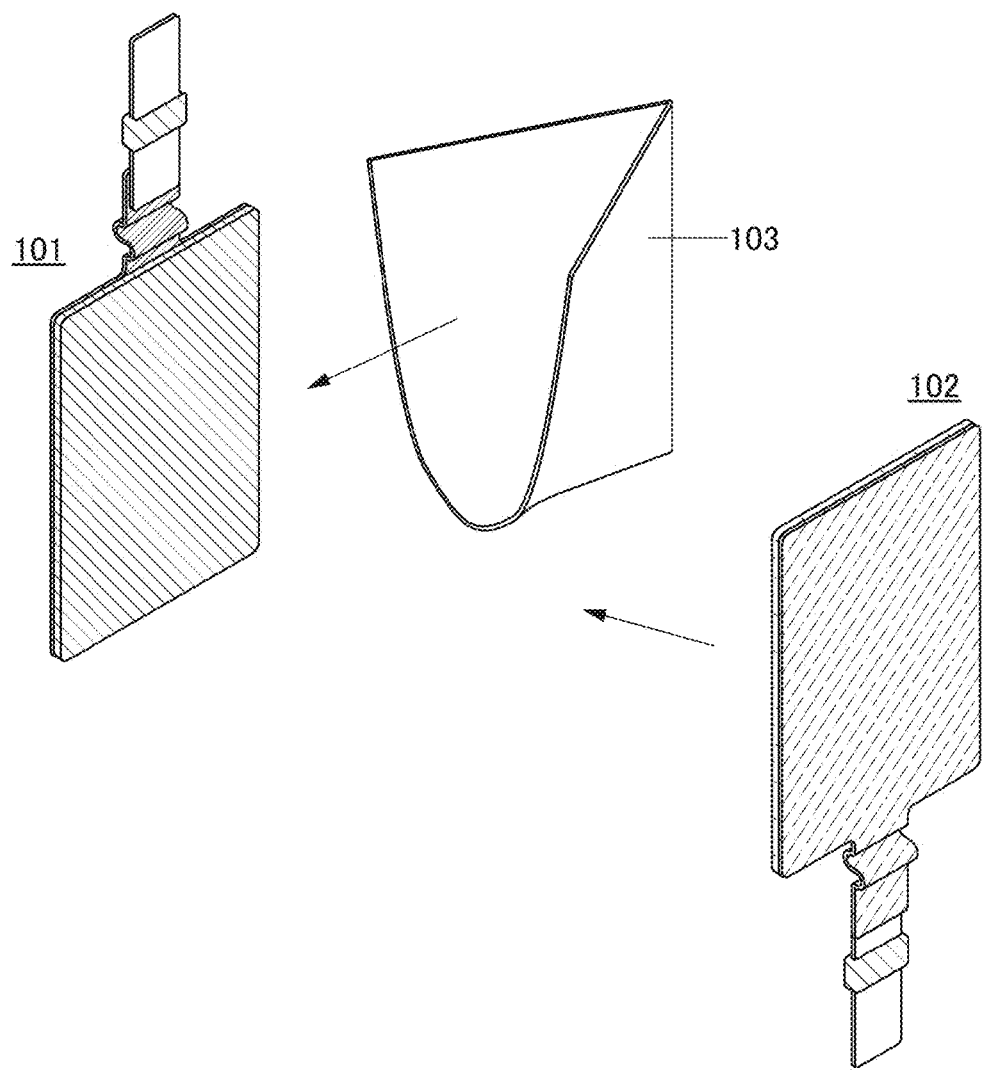
FIG. 11 illustrates an example of a method of manufacturing a power storage unit.

Alternatively, the separator 103 having a bag shape may be used, in which case one or both of the positive electrode 101 and the negative electrode 102 are placed inside the bag-shaped separator 103. In FIG. 11, the positive electrode 101 is placed inside the bag-shaped separator 103 and then overlaps with the negative electrode 102. Alternatively, the separator 103 may have an envelope shape.

A double-folded, bag-shaped, or envelope-shaped separator can increase the productivity of the power storage unit when the number of the electrodes used in the power storage unit is three or more, including the positive electrode 101 and the negative electrode 102.

Figure 12A:
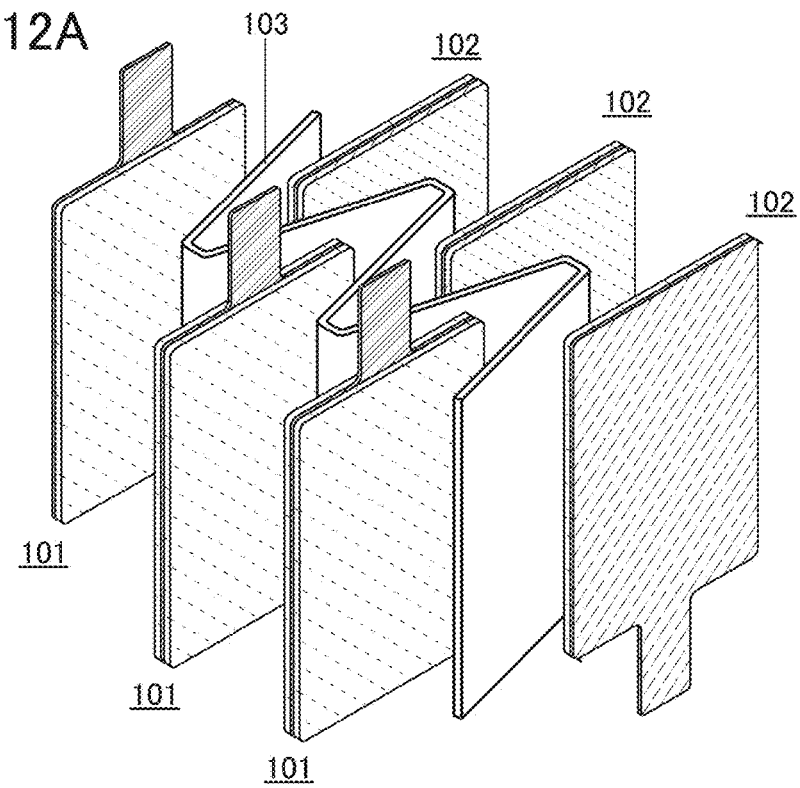
FIGS. 12A to 12C illustrate an example of a method of manufacturing a power storage unit.

Furthermore, when the number of the electrodes used in the power storage unit is three or more, use of a separator bent in a wave (zigzag) shape is particularly effective. FIG. 12A is a perspective view in which the positive electrodes 101 and the negative electrodes 102 alternately overlap with each other with the separator 103 bent in a wave shape interposed therebetween. In FIG. 12A, the positive electrodes 101 and the negative electrodes 102, in each of which an active material layer is formed on each surface of a current collector, are placed between the positive electrode 101 and the negative electrode 102, in each of which an active material layer is formed on one surface of a current collector.

Figure 12B:
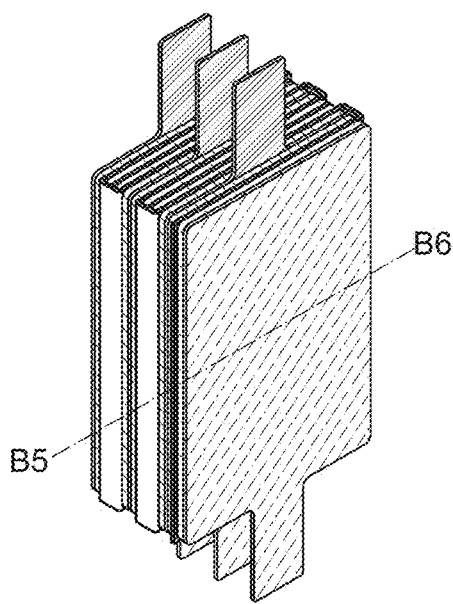
Figure 12C:
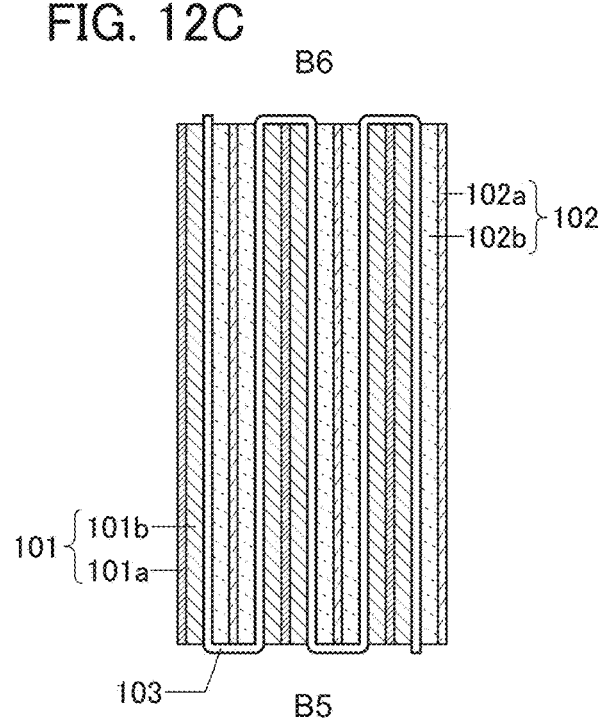

FIG. 12B is a perspective view in which a plurality of positive electrodes 101 and a plurality of the negative electrodes 102 overlap with each other with the separator 103 bent in a wave shape interposed therebetween. FIG. 12C is a cross-sectional view of FIG. 12B taken along the dash-dot line B5-B6.

The separator bent in a wave shape can further increase the productivity of the power storage unit when the number of the electrodes used in the power storage unit is three or more, including the positive electrode 101 and the negative electrode 102.

When a plurality of separators 103 are used in the power storage unit 100, all the separators 103 may contain the same material or the separators 103 containing different materials may be combined. Furthermore, when a plurality of separators 103 are used in the power storage unit 100, all the separators 103 may have the same shape or the separators 103 having different shapes may be combined.

Figure 13A:
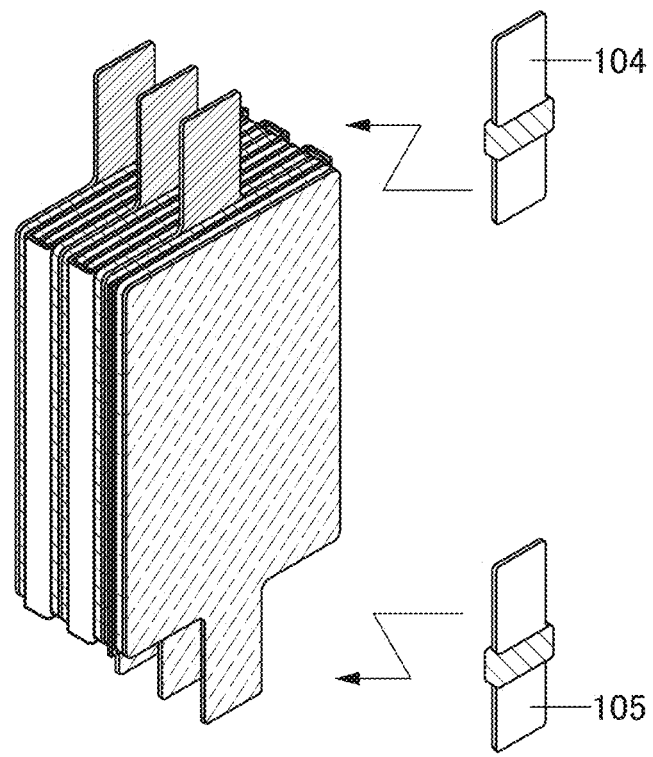
FIGS. 13A and 13B illustrate an example of a method of connecting a lead terminal to a plurality of positive electrodes or a plurality of negative electrodes.
Figure 13B:
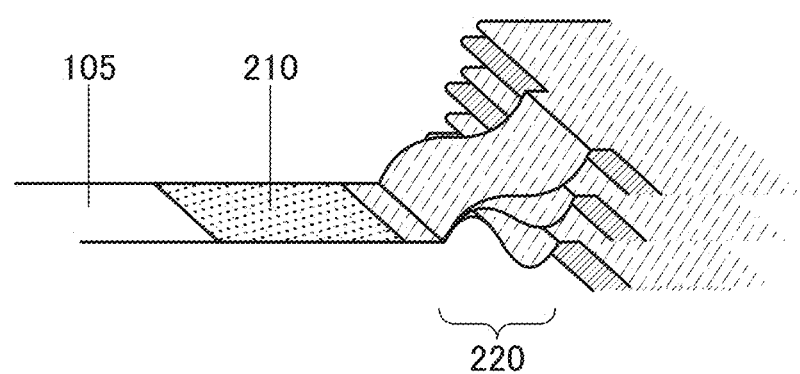

When a power storage unit including a plurality of positive electrodes 101 and a plurality of negative electrodes 102 is fabricated, it is preferable that, after overlap of the positive electrodes 101, the separator 103, and the negative electrodes 102, a plurality of positive electrode tabs be collectively connected to one positive electrode lead 104 (see FIG. 13A). It is also preferable that the negative electrode tabs be collectively connected to one negative electrode lead 105. The connection between the positive electrode tabs and the positive electrode lead 104 and the connection between the negative electrode tabs and the negative electrode lead 105 can be performed using the ultrasonic welding apparatus including the bonding dies as described above. FIG. 13B is a perspective view in which the connection region 210 and the bend portion 220 of the negative electrode tab are enlarged. By collectively connecting the plurality of positive electrode tabs to one positive electrode lead 104 and connecting the plurality of negative electrode tabs to one negative electrode lead 105, production efficiency of the power storage unit can be increased.

[4. Exterior Body]

The secondary battery can have any of a variety of structures. In this embodiment, a film is used for the exterior body 107. Note that the film used for the exterior body 107 is a single-layer film selected from a metal film (e.g., an aluminum film, a stainless steel film, and a nickel steel film), a plastic film (thermoplastic film) made of an organic material, a hybrid material film including an organic material (e.g., an organic resin or fiber) and an inorganic material (e.g., ceramic), and a carbon-containing film (e.g., a carbon film or a graphite film); or a stacked-layer film including two or more of the above films. A metal film is easy to process to form projections and depressions so that the exterior body 107 having a bellows structure can be easily formed. In addition, a metal film can achieve efficient heat dissipation. Formation of depressions or projections of the exterior body 107 increases the surface area of the exterior body 107 which is exposed to outside air, leading to more efficient heat dissipation.

In the case where the power storage unit 100 is changed in form by externally applied force, the exterior body 107 might partly be deformed or damaged. The exterior body 107 having depressions or projections can relieve a strain caused by stress applied to the exterior body 107 and increase the bending strength. Furthermore, the exterior body becomes less likely to be broken even when repeatedly bent or stretched. Thus, the power storage unit 100 can be highly reliable. Note that a "strain" is the scale of change in form indicating the displacement of a point of an object relative to the reference (initial) length of the object. The exterior body 107 having depressions or projections can reduce the influence of a strain caused by application of external force to the power storage unit to an acceptable level. Thus, the power storage unit having high reliability can be provided.

Figure 14A:
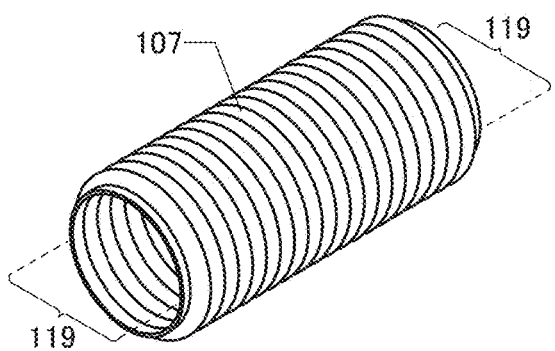
FIGS. 14A to 14C illustrate an example of a method of manufacturing a power storage unit.
Figure 14B:
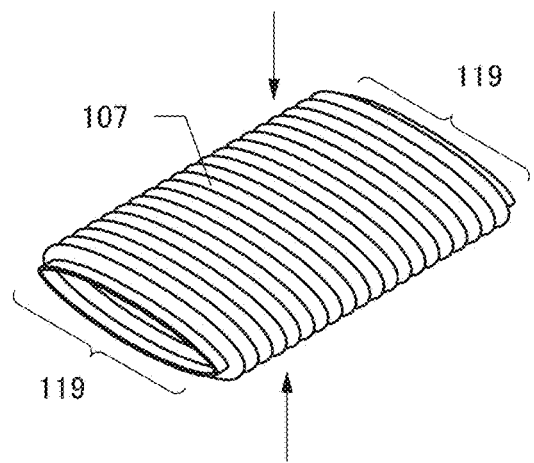
Figure 14C:
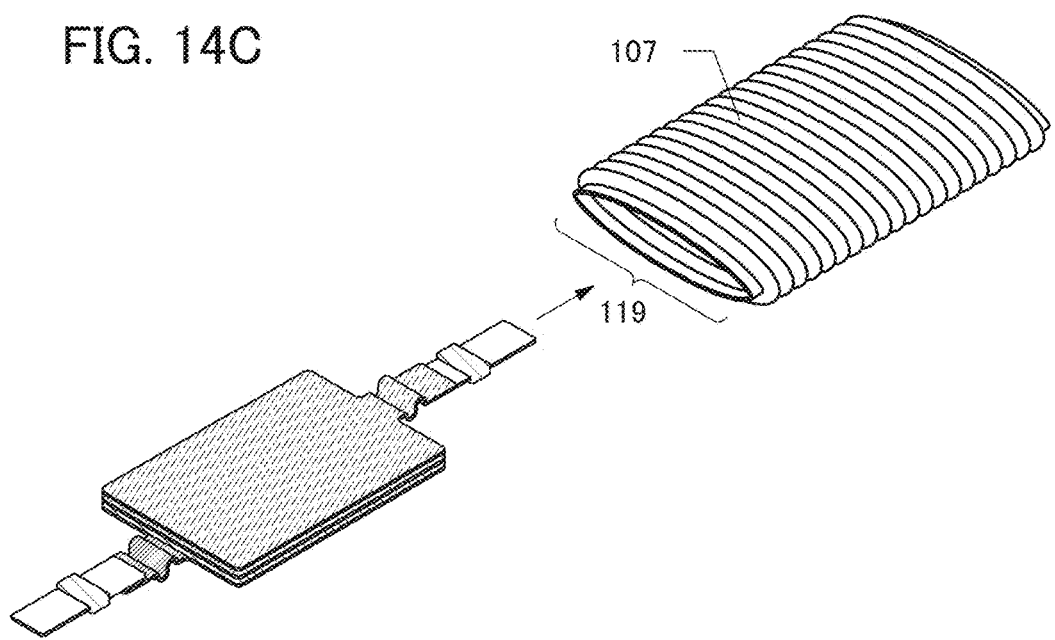

FIG. 14A is a perspective view showing an appearance of the tube-shaped exterior body 107 having a bellows structure. FIG. 14B is a perspective view showing the tube-shaped exterior body 107 in the diameter direction (in such a way that a circle is pressed). The tube-shaped exterior body 107 having a bellows structure is deformed, and the positive electrode 101, the separator 103, and the negative electrode 102 are put into the inside of the exterior body 107 through an introduction port 119 (FIG. 14C).

Next, one of the two introduction ports 119 of the exterior body 107 is sealed by thermocompression bonding. In thermocompression bonding, the sealing layers 115 provided over the lead electrodes are also melted, thereby fixing the lead electrodes and the exterior body 107 to each other.

[5. Electrolyte Solution]

Next, in a reduced-pressure atmosphere or an inert atmosphere, a desired amount of electrolyte solution is introduced to the inside of the exterior body 107 through the introduction port 119.

As a solvent of the electrolyte solution 106 used for the power storage unit 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage and the like is improved. Further, the secondary battery can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more ionic liquids (room temperature molten salts) which are less likely to burn and volatilize as the solvent of the electrolyte solution can prevent the power storage unit from exploding or catching fire even when the power storage unit internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for the power storage unit preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

Finally, the introduction port 119 is sealed by thermocompression bonding. In the above-described manner, the power storage unit 100 can be fabricated. By using the tube-shaped exterior body 107, the number of steps of bonding the outer edges of the exterior body 107 can be reduced and production efficiency of the power storage unit 100 can be increased. The bellows structure of the exterior body 107 enables the power storage unit 100 to have improved flexibility, thereby achieving a highly reliable power storage unit which is less likely to be broken.

This embodiment can be implemented in appropriate combination with any of the other embodiments.

Embodiment 2

Figure 15A:
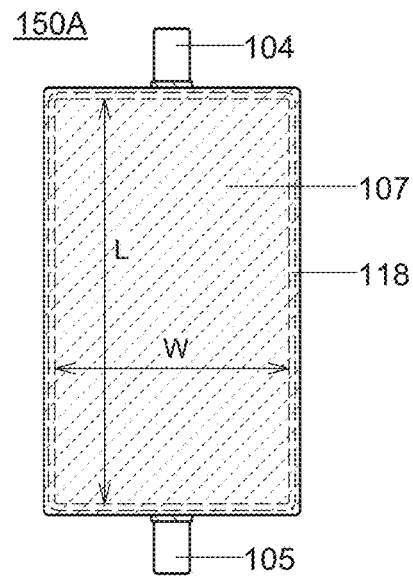
FIGS. 15A to 15C illustrate an example of a method of manufacturing a power storage unit.
Figure 15B:
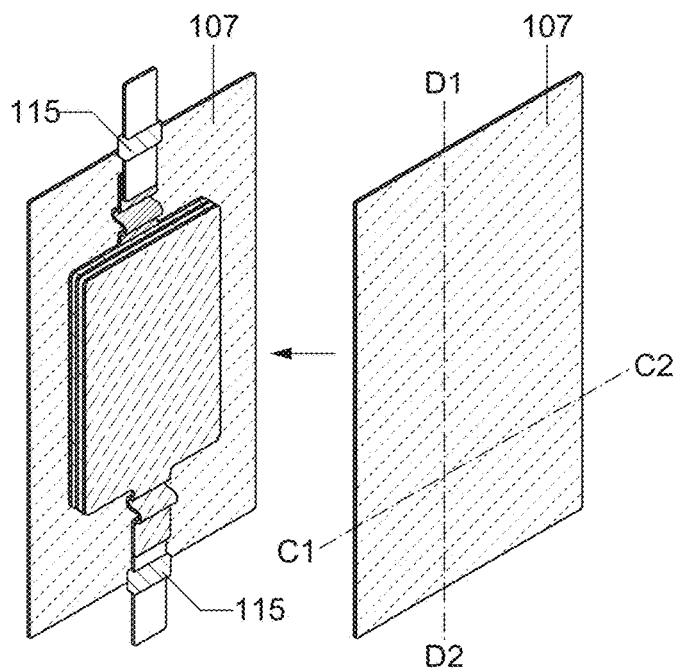
Figure 15C:
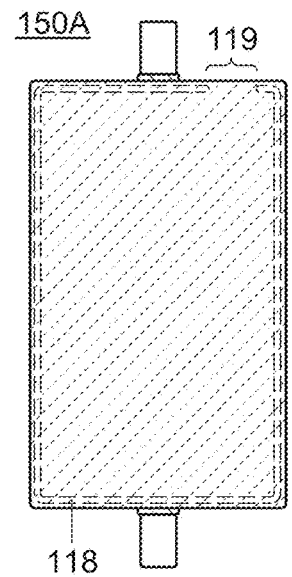

In this embodiment, a power storage unit having a structure different from that in Embodiment 1 is described using FIGS. 15A to 15C. Note that the power storage unit described in this embodiment can be fabricating using a material and a method similar to those used for the power storage unit described in Embodiment 1. Hence, a description is made of portions different from those in Embodiment 1 to avoid repetition of the same description.

FIG. 15A is a front view of a power storage unit 150A. FIG. 15B illustrates an example of a method of manufacturing the power storage unit 150A. The power storage unit 150A is different from the power storage unit 100 of Embodiment 1 in a formation method of the exterior body 107. In the power storage unit 150A, the positive electrode 101, the separator 103, and the negative electrode 102 are placed between two plate-shaped exterior bodies 107.

After the positive electrode 101, the separator 103, and the negative electrode 102 are placed between the two plate-shaped exterior bodies 107, the outer edges of the exterior bodies 107 except the introduction port 119 for introducing the electrolyte solution 106 are bonded to each other by thermocompression bonding (see FIG. 15C). Note that the introduction port 119 may be at any position of the outer edges. In thermocompression bonding, the sealing layers 115 provided over the lead electrodes are also melted, thereby fixing the lead electrodes and the exterior bodies 107 to each other. A portion where the outer edges of the exterior bodies 107 are bonded to each other by thermocompression bonding is shown as a bonding portion 118 in FIGS. 15A and 15C.

After that, in a reduced-pressure atmosphere or an inert atmosphere, a desired amount of electrolyte solution 106 is introduced to the inside of the exterior bodies 107 through the introduction port 119. Finally, the introduction port 119 is sealed by thermocompression bonding. In the above-described manner, the power storage unit 150A can be manufactured (see FIG. 15A).

Projections and depressions of the exterior body 107 enables the power storage unit 150A to have improved flexibility, thereby achieving a highly reliable power storage unit which is less likely to be broken. Examples of a cross-sectional shape of the exterior body 107 having projections and depressions are illustrated in FIGS. 16A to 16H. FIGS. 16A to 16H are cross-sectional views of FIG. 15B taken along the dash-dot line C1-C2 or D1-D2. The line C1-C2 extends in the horizontal direction of the exterior body 107 and the line D1-D2 extends in the vertical direction of the exterior body 107.

Figure 16A:
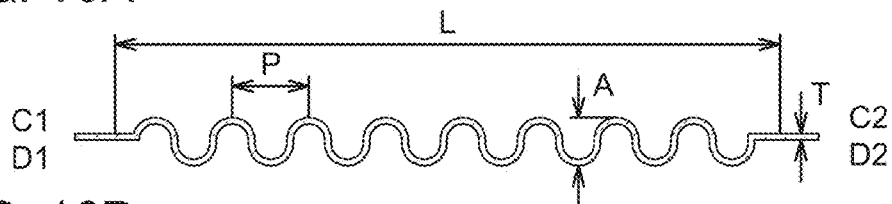
FIGS. 16A to 16H illustrate examples of a cross-sectional shape of an exterior body.
Figure 16B:
Figure 16C:

FIGS. 16A to 16C illustrate examples of a wave-shaped cross-section of the alternating curved projections and depressions. The projections and the depressions are provided, as in FIG. 16A, in a region except where an end portion of the exterior body 107 overlaps with the bonding portion 118, but may be provided also at the end portion of the exterior body 107 as illustrated in FIG. 16B. When where the power storage unit is bent is determined, the projections and the depressions may be provided at part of the exterior body 107 as illustrated in FIG. 16C.

In a vertical cross section, a pitch P of the projections and depressions is preferably less than or equal to one tenth of a length L, more preferably less than or equal to one twentieth thereof, further preferably less than or equal to one fiftieth thereof. In a horizontal cross section, the pitch P of the projections and depressions is preferably less than or equal to one tenth of a length W, more preferably less than or equal to one twentieth thereof, further preferably less than or equal to one fiftieth thereof.

Here, the length L is the linear vertical distance of a region surrounded by the bonding portion 118. Alternatively, the length L is the linear vertical distance of a region in which the positive electrode 101 and the negative electrode 102 are provided. In addition, the length W is the linear horizontal distance of the region surrounded by the bonding portion 118. Alternatively, the length W is the linear horizontal distance of the region in which the positive electrode 101 and the negative electrode 102 are provided (see FIG. 15A).

A height difference A between the projections and the depressions is preferably five or more times, more preferably ten or more times, further preferably twenty or more times as large as a thickness T of the exterior body (see FIG. 16A).

It is not necessary that each of the pitch P and the height difference A be entirely uniform along the length L or the length W. For example, the pitch P and/or the height difference A may differ depending on the position of the exterior body. In other words, the pitch P and/or the height difference A may have two or more values. The pitch P and/or the height difference A may continuously vary in the vertical and/or horizontal direction.

Note that when the power storage unit of one embodiment of the present invention is bent, the pitch P on the inner side of the bend portion is smaller in some cases than the pitch P on the outer side of the bend portion, or the pitch P on the outer side of the bend portion is larger in some cases than the pitch P on the inner side of the bend portion.

Figure 16D:
Figure 16E:
Figure 16F:
Figure 16G:
Figure 16H:
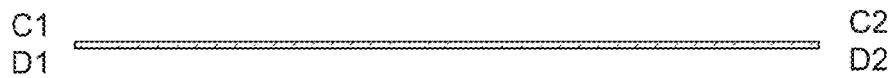

The cross-sectional shape of the projections and depressions of the exterior body 107 is not limited to a shape including a curve and may be a shape including a straight line as in FIGS. 16D to 16F, such as a rectangle wave shape or a triangle wave shape. Alternatively, as illustrated in FIG. 16G, a shape combining a curve and a straight line may be used. Furthermore, when no projections and depressions alternate in at least one of the horizontal and vertical directions of the exterior body 107, the shape of a cross section along the direction where no projections and depressions alternate is as in FIG. 16H. The cross sections illustrated as examples in FIGS. 16A to 16H can be combined as appropriate.

Figure 17:
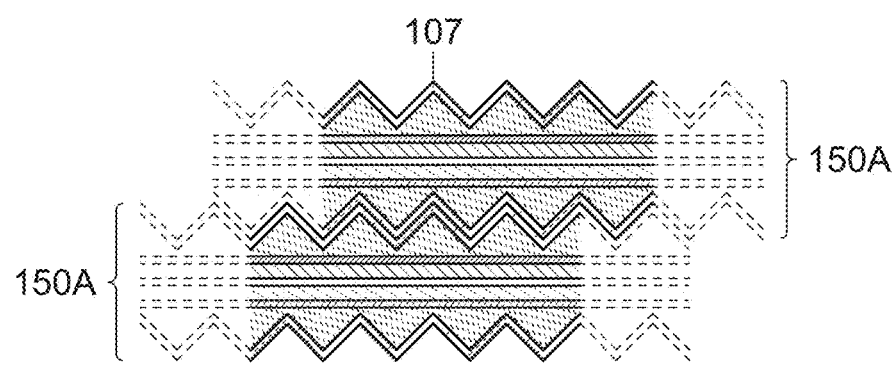
FIG. 17 illustrates a cross section of power storage units overlapping with each other.

FIG. 17 is a cross-sectional view of two power storage units 150A overlapping with each other in which the exterior bodies 107 have projections and depressions alternating in a triangle wave shape. As illustrated in FIG. 17, a plurality of power storage units overlapping with each other can engage with each other by adjusting the shape and pitch P of the projections and depressions of each exterior body. The projections and depressions of the exterior bodies which engage with each other can prevent misalignment of the plurality of power storage units.

Note that although the power storage units 150A are illustrated in FIG. 17 as an example of power storage units in which exterior bodies engage with each other, power storage units such as the power storage unit 100 can also have a similar effect.

Figure 18A:
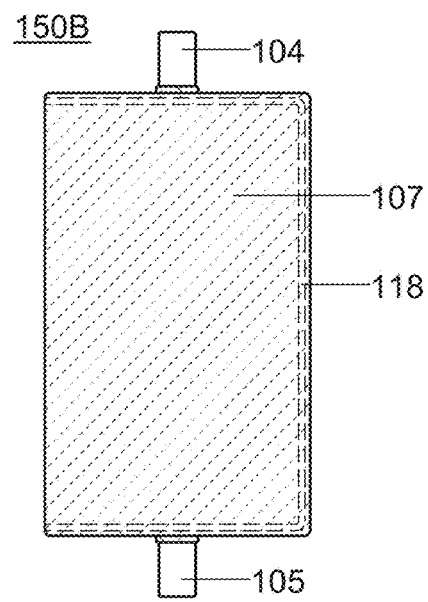
FIGS. 18A to 18C illustrate an example of a method of manufacturing a power storage unit.
Figure 18B:
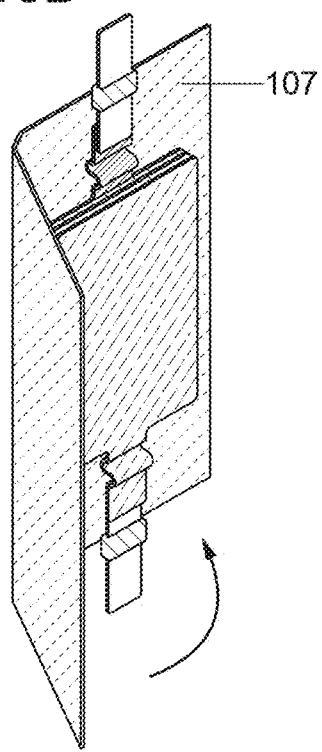

FIG. 18A is a front view of a power storage unit 150B. FIG. 18B illustrates an example of a method of manufacturing the power storage unit 150B. The power storage unit 150B is different from the power storage unit 100 and the power storage unit 150A in a formation method of the exterior body 107. In the power storage unit 150B, the positive electrode 101, the separator 103, and the negative electrode 102 are placed inside the double-folded exterior body 107.

Figure 18C:
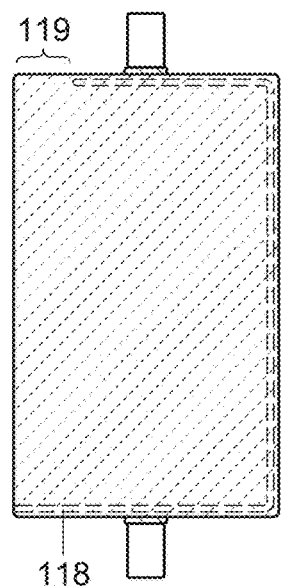

After the positive electrode 101, the separator 103, and the negative electrode 102 are placed between the two plate-shaped exterior bodies 107, the outer edges of the exterior body 107 except the introduction port 119 for introducing the electrolyte solution 106 are bonded to each other by thermocompression bonding (see FIG. 18C).

After that, in a reduced-pressure atmosphere or an inert atmosphere, a desired amount of the electrolyte solution 106 is introduced to the inside of the exterior body 107 through the introduction port 119. Finally, the introduction port 119 is sealed by thermocompression bonding. In the above-described manner, the power storage unit 150B can be manufactured (see FIG. 18A).

Since the power storage unit 150B is fabricated using the double-folded exterior body 107, the length of the bonding portion 118 can be shorter than that in the power storage unit 150A. Accordingly, the time for manufacturing the power storage unit can be reduced. According to one embodiment of the present invention, production efficiency of the power storage unit can be increased.

As in the power storage unit 150A, the cross-sectional shapes illustrated in FIGS. 16A to 16H can be applied to the double-folded exterior body 107.

Figure 19A:
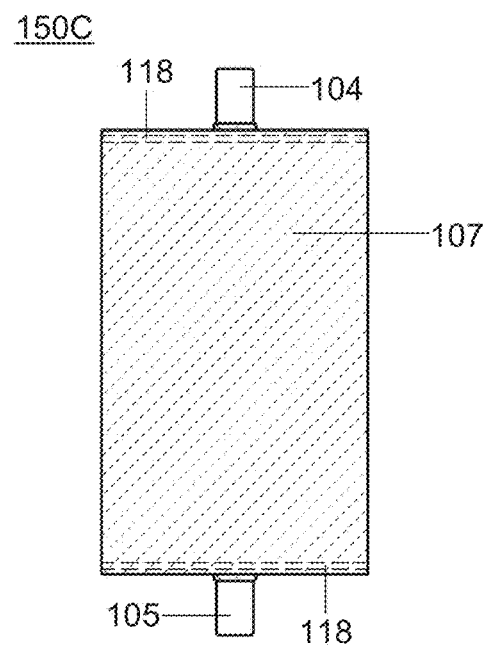
FIGS. 19A to 19C illustrate an example of a method of manufacturing a power storage unit.
Figure 19B:
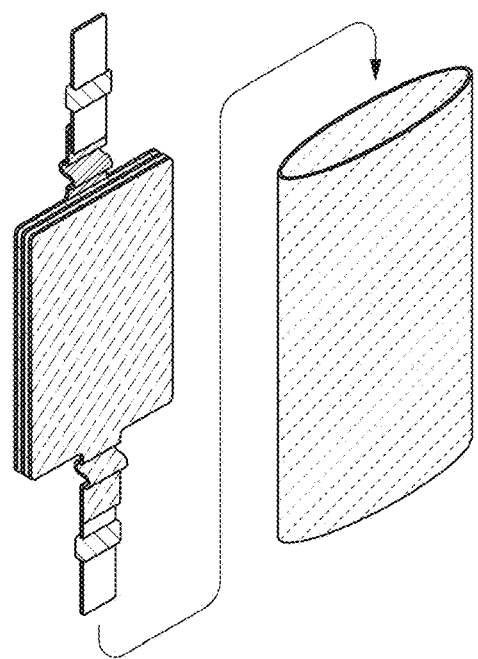

FIG. 19A is a front view of a power storage unit 150C. FIG. 19B illustrates an example of a method of manufacturing the power storage unit 150C. The power storage unit 150C includes the tube-shaped exterior body 107 having two openings, like the power storage unit 100.

Figure 19C:
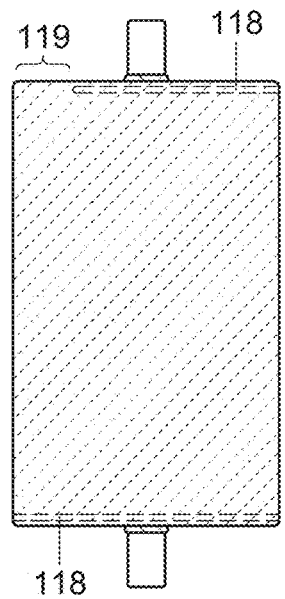

After the positive electrode 101, the separator 103, and the negative electrode 102 are placed inside the tube-shaped exterior body 107, the openings of the tube-shaped exterior body 107 except the introduction port 119 for introducing the electrolyte solution 106 to part of one of the openings are sealed by thermocompression bonding (see FIG. 19C).

After that, in a reduced-pressure atmosphere or an inert atmosphere, a desired amount of the electrolyte solution 106 is introduced to the inside of the exterior body 107 through the introduction port 119. Finally, the introduction port 119 is sealed by thermocompression bonding. In the above-described manner, the power storage unit 150C can be manufactured (see FIG. 19A).

Since the power storage unit 150C is fabricated using the tube-shaped exterior body 107, the length of the bonding portion 118 can be shorter than that in the power storage units 150A and 150B. Accordingly, the time for manufacturing the power storage unit can be reduced. According to one embodiment of the present invention, production efficiency of the power storage unit can be increased.

As in the power storage unit 150A, the cross-sectional shapes illustrated in FIGS. 16A to 16H can be applied to the tube-shaped exterior body 107.

Embodiment 3

In this embodiment, examples of a direction in which a lead terminal is withdrawn and appearance shapes of power storage units are described using FIGS. 20A to 20D and FIGS. 21A to 21D.

Figure 20A:
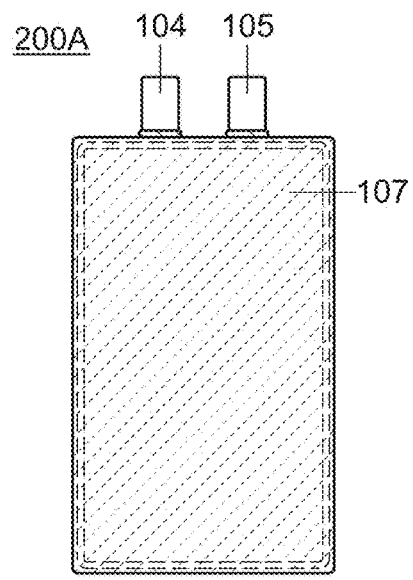
FIGS. 20A to 20D illustrate examples of a direction in which a lead terminal is withdrawn.

FIG. 20A is a front view of a power storage unit 200A. In the power storage unit 200A, the positive electrode lead 104 and the negative electrode lead 105 are provided on the same side of the exterior body 107.

Figure 20B:
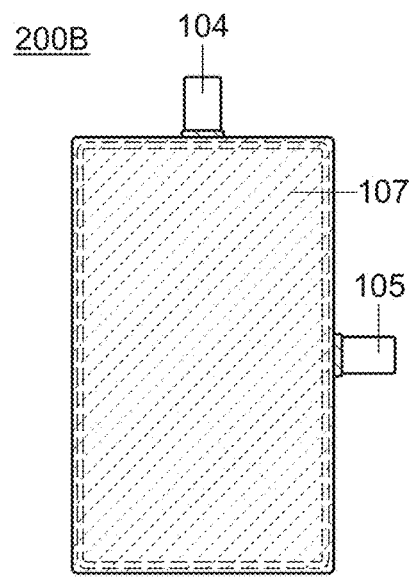
Figure 20C:
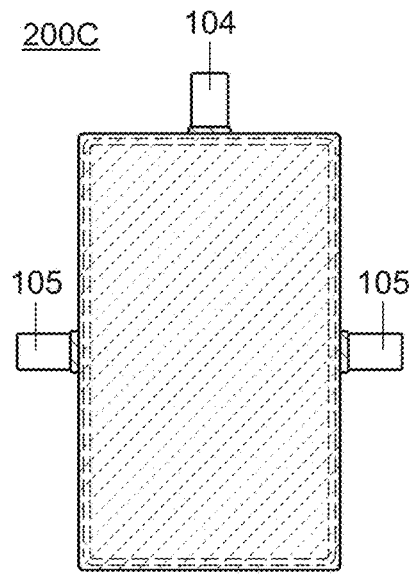

FIG. 20B is a front view of a power storage unit 200B. In the power storage unit 200B, the positive electrode lead 104 and the negative electrode lead 105 are provided on different sides of the exterior body 107.

A power storage unit according to one embodiment of the present invention may have one or more positive electrode leads 104 and one or more negative electrode leads 105. For example, as in a power storage unit 200C illustrated in FIG. 20C, one positive electrode lead 104 and two negative electrode leads 105 may be placed on different sides. Alternatively, two positive electrode leads 104 and one negative electrode lead 105 may be placed on different sides.

Figure 20D:
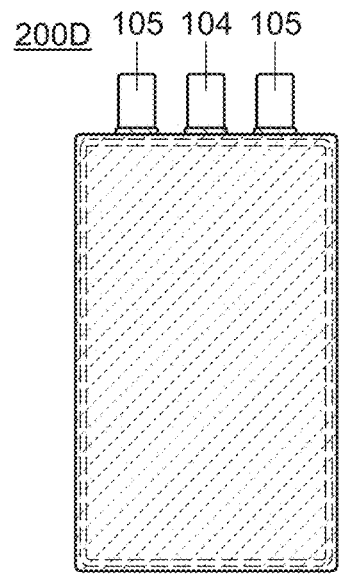

For example, as in a power storage unit 200D illustrated in FIG. 20D, one positive electrode lead 104 and two negative electrode leads 105 may be placed on the same side. Alternatively, two positive electrode leads 104 and one negative electrode lead 105 may be placed on the same side.

For example, as in a power storage unit 200E illustrated in FIG. 21A, positive electrode leads 104 and negative electrode leads 105 may be placed on different four sides.

For example, as in a power storage unit 200F illustrated in FIG. 21B, a plurality of positive electrode leads 104 and a plurality of negative electrode leads 105 may be placed.

Furthermore, an appearance shape of a power storage unit according to one embodiment of the present invention is not limited to a rectangle and may have a curve portion like that of a power storage unit 200G illustrated in FIG. 21C, for example. Alternatively, the appearance shape may be like a shape resulting from partial removal of the shapes given above, such as that of a power storage unit 200H illustrated in FIG. 21D.

In a power storage unit according to one embodiment of the present invention, the number of the lead terminals used and the positions where the lead terminals are withdrawn can be freely determined. According to one embodiment of the present invention, a power storage unit with a high degree of design freedom can be provided.

Embodiment 4

The power storage unit of one embodiment of the present invention can be used as a power storage device of various electronic devices which are driven by electric power. FIGS. 24A to 24G, FIGS. 25A to 25C, FIG. 26, and FIGS. 27A and 27B illustrate specific examples of the electronic devices using a power storage device of one embodiment of the present invention.

Specific examples of the electronic devices using the power storage device of one embodiment of the present invention are as follows: display devices of televisions, monitors, and the like, lighting devices, desktop and laptop personal computers, word processors, image reproduction devices which reproduce still images and moving images stored in recording media such as digital versatile discs (DVDs), portable CD players, radios, tape recorders, headphone stereos, stereos, table clocks, wall clocks, cordless phone handsets, transceivers, mobile phones, car phones, portable game machines, tablet terminals, large game machines such as pachinko machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as a chain saw, smoke detectors, and medical equipment such as dialyzers. Other examples are as follows: industrial equipment such as guide lights, traffic lights, conveyor belts, elevators, escalators, industrial robots, power storage systems, and industrial equipment for leveling the amount of power supply and smart grid. In addition, moving objects and the like driven by electric motors using power from a power storage device are also included in the category of electronic devices. Examples of the moving objects include electric vehicles (EVs), hybrid electric vehicles (HEVs) which include both an internal-combustion engine and a motor, plug-in hybrid electric vehicles (PHEVs), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In addition, the power storage device of one embodiment of the present invention can be incorporated along a curved inside/outside wall surface of a house or a building or a curved interior/exterior surface of a car.

Figure 24A:
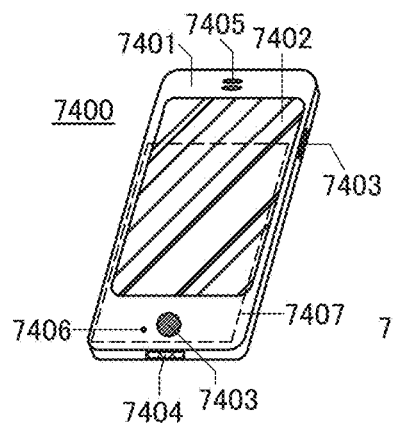
FIGS. 24A to 24G illustrate examples of an electronic device.

FIG. 24A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 24B:
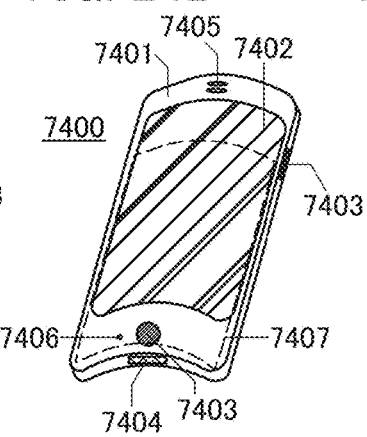
Figure 24C:
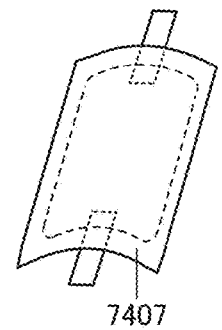

The mobile phone 7400 illustrated in FIG. 24B is bent. When the whole mobile phone 7400 is bent by external force, the power storage device 7407 included in the mobile phone 7400 is also bent. FIG. 24C illustrates the bent power storage device 7407.

Figure 24D:
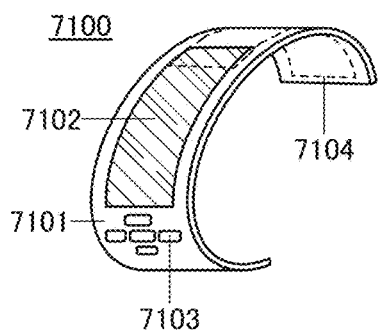
Figure 24E:

FIG. 24D illustrates an example of a bangle display device. A portable display device 7100 includes a housing 7101, a display portion 7102, an operation button 7103, and a power storage device 7104. FIG. 24E illustrates the bent power storage device 7104.

Figure 24F:
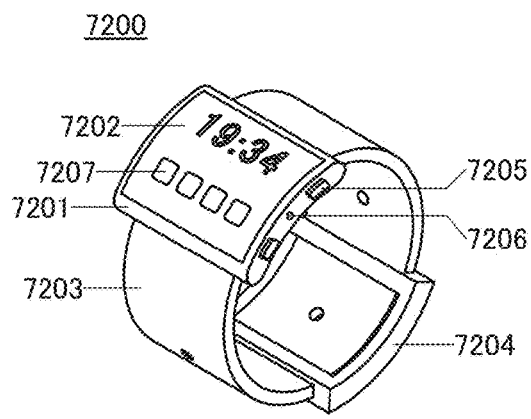

FIG. 24F illustrates an example of a wrist-watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. Further, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power ON/OFF, ON/OFF of wireless communication, setting and cancellation of manner mode, and setting and cancellation of power saving mode can be performed. For example, the functions of the operation button 7205 can be set freely by setting the operation system incorporated in the portable information terminal 7200.

Further, the portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. Power charging through the input output terminal 7206 is possible. Note that the charging operation may be performed by wireless power feeding without using the input output terminal 7206.

The portable information terminal 7200 includes the power storage device of one embodiment of the present invention. For example, the power storage device 7104 shown in FIG. 24E can be incorporated in the housing 7201 with a state where the power storage device 7104 is bent or can be incorporated in the band 7203 with a state where the power storage device 7104 can be bent.

Figure 24G:
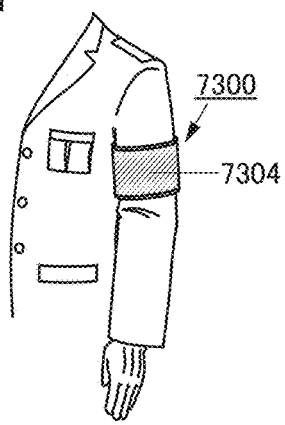

FIG. 24G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method in accordance with an existing communication standard.

The display device 7300 includes an input output terminal, and data can be directly transmitted to and received from another information terminal via a connector. Power charging through the input output terminal is possible. Note that the charging operation may be performed by wireless power feeding without using the input output terminal.

Figure 25A:
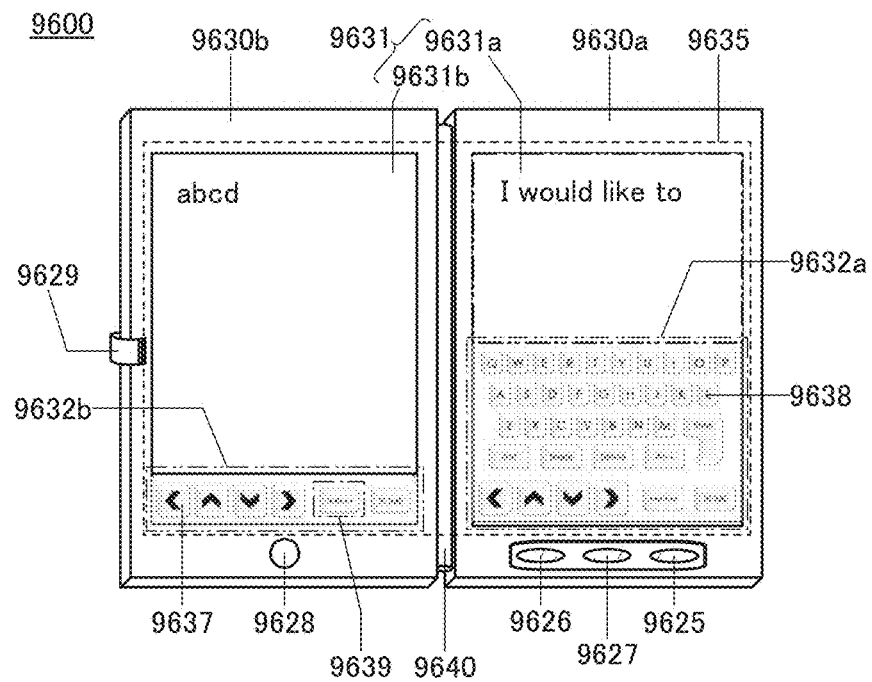
FIGS. 25A to 25C illustrate an example of an electronic device.
Figure 25B:
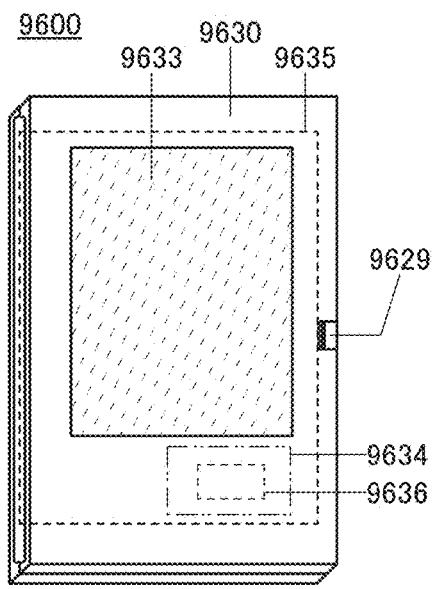

FIGS. 25A and 25B illustrate an example of a foldable tablet terminal. A tablet terminal 9600 illustrated in FIGS. 25A and 25B includes a housing 9630a, a housing 9630b, a movable portion 9640 connecting the housings 9630a and 9630b, a display portion 9631 provided with a display portion 9631a and a display portion 9631b, a display mode switch 9626, a power switch 9627, a power saver switch 9625, a fastener 9629, and an operation switch 9628. FIGS. 25A and 25B illustrate the tablet terminal 9600 opened and closed, respectively.

The tablet terminal 9600 includes a power storage device 9635 inside the housings 9630a and 9630b. The power storage device 9635 is provided across the housings 9630a and 9630b, passing through the movable portion 9640.

Part of the display portion 9631a can be a touch panel region 9632a and data can be input when a displayed operation key 9638 is touched. The drawing shows, but is not limited to, a structure in which a half region in the display portion 9631a has only a display function and the other half region has a touch panel function. The whole area of the display portion 9631a may have a touch panel function. For example, the whole area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode switch 9626 can switch the display between portrait mode, landscape mode, and the like, and between monochrome display and color display, for example. The power saver switch 9625 can control display luminance in accordance with the amount of external light in use of the tablet terminal 9600, which is measured with an optical sensor incorporated in the tablet terminal 9600. The tablet terminal may include another detection device such as a gyroscope or an acceleration sensor in addition to the optical sensor.

FIG. 25A illustrates, but is not limited to, an example in which the display portions 9631a and 9631b have the same display area. The display portions 9631a and 9631b may have different display areas and different display quality. For example, higher-resolution images may be displayed on one of the display portions 9631a and 9631b.

The tablet terminal is closed in FIG. 25B. The tablet terminal includes the housing 9630, a solar cell 9633, and a charge and discharge control circuit 9634 including a DC-DC converter 9636. The power storage unit of one embodiment of the present invention can be used for the power storage device 9635.

The tablet terminal 9600 can be folded in two so that the housings 9630a and 9630b overlap with each other when not in use. Thus, the display portions 9631a and 9631b can be protected, which increases the durability of the tablet terminal 9600. In addition, the power storage device 9635 of one embodiment of the present invention has flexibility and can be repeatedly bent without a large decrease in charge and discharge capacity. Thus, a highly reliable tablet terminal can be provided.

The tablet terminal illustrated in FIGS. 25A and 25B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that a structure in which the solar cell 9633 is provided on one or both surfaces of the housing 9630 is preferable because the power storage device 9635 can be charged efficiently. The use of a lithium-ion battery as the power storage device 9635 brings an advantage such as a reduction in size.

Figure 25C:
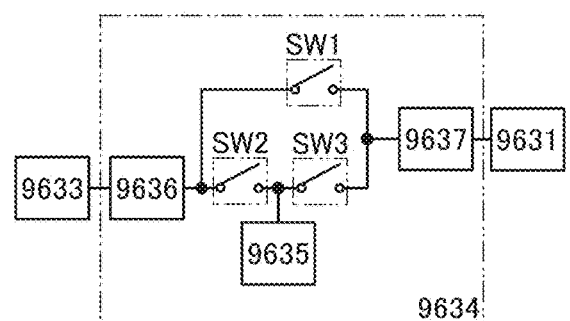

The structure and operation of the charge and discharge control circuit 9634 in FIG. 25B are described with reference to a block diagram in FIG. 25C. The solar cell 9633, the power storage device 9635, the DC-DC converter 9636, a converter 9637, switches SW1 to SW3, and the display portion 9631 are illustrated in FIG. 25C, and the power storage device 9635, the DC-DC converter 9636, the converter 9637, and the switches SW1 to SW3 correspond to the charge and discharge control circuit 9634 in FIG. 25B.

First, an example of the operation in the case where electric power is generated by the solar cell 9633 using external light is described. The voltage of electric power generated by the solar cell is raised or lowered by the DC-DC converter 9636 to a voltage for charging the power storage device 9635. Then, when the electric power from the solar cell 9633 is used for the operation of the display portion 9631, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the power storage device 9635 can be charged.

Note that the solar cell 9633 is described as an example of a power generation means; however, one embodiment of the present invention is not limited to this example. The power storage device 9635 may be charged using another power generation means such as a piezoelectric element or a thermoelectric conversion element (Peltier element). For example, the power storage device 9635 may be charged using a non-contact power transmission module that transmits and receives electric power wirelessly (without contact) or using another charging means in combination.

Figure 26:
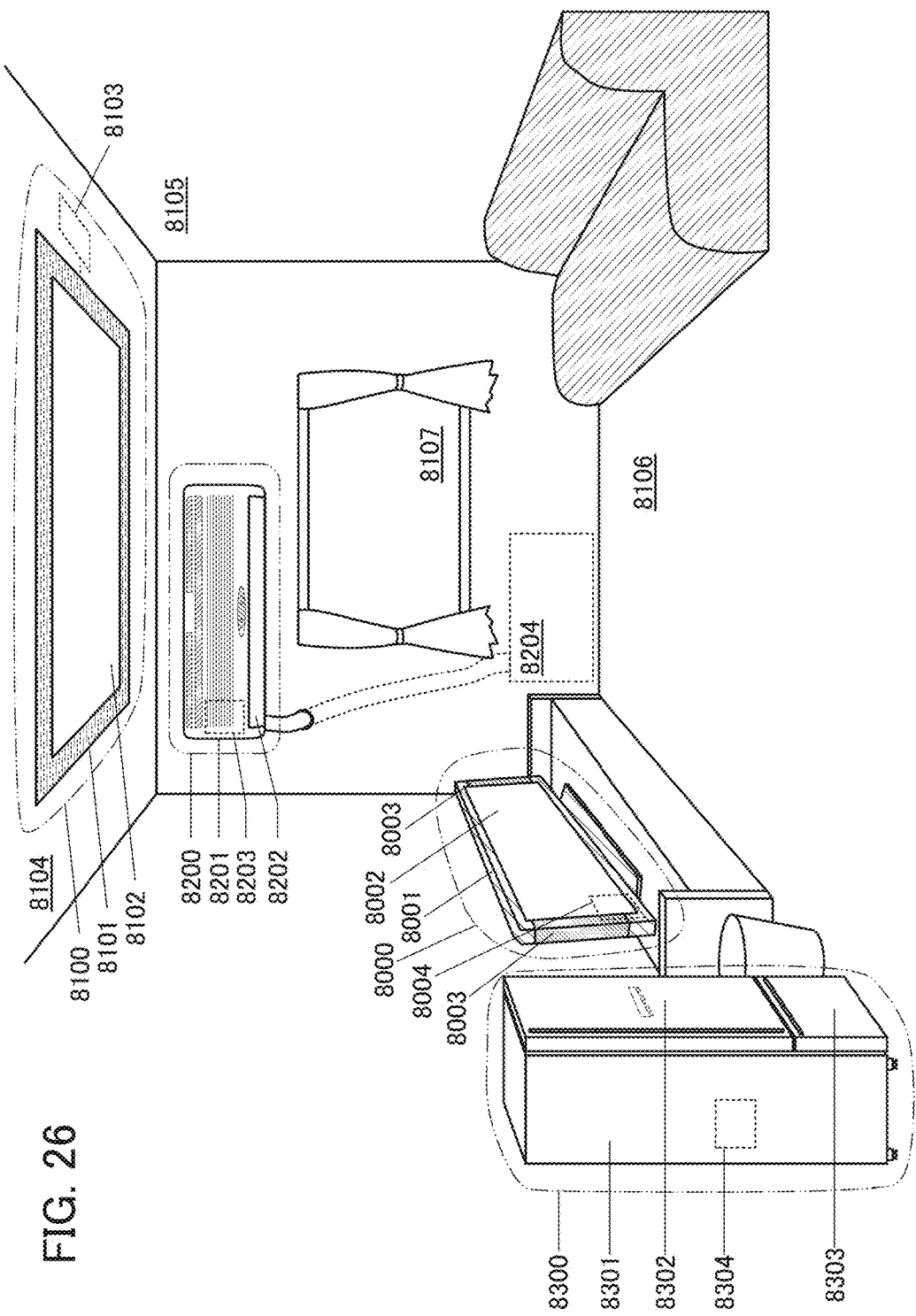
FIG. 26 illustrates examples of an electronic device.

FIG. 26 illustrates examples of other electronic devices. In FIG. 26, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power source or use electric power stored in the power storage device 8004. Thus, the display device 8000 can operate with the use of the power storage device 8004 of one embodiment of the present invention as an uninterruptible power source even when electric power cannot be supplied from a commercial power source because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all information display devices for personal computers, advertisement displays, and the like besides the ones for TV broadcast reception.

In FIG. 26, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 26 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power source or use electric power stored in the power storage device 8103. Thus, the lighting device 8100 can operate with the use of the power storage device 8103 of one embodiment of the present invention as an uninterruptible power source even when electric power cannot be supplied from a commercial power source because of power failure or the like.

Note that although the installation lighting device 8100 provided in the ceiling 8104 is illustrated in FIG. 26 as an example, the power storage device of one embodiment of the present invention can be used in an installation lighting device provided in, for example, a wall 8105, a floor 8106, a window 8107, or the like besides the ceiling 8104. Alternatively, the power storage device can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 26, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 26 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive electric power from a commercial power source or use electric power stored in the power storage device 8203. Particularly in the case where the power storage device 8203 is provided in both the indoor unit 8200 and the outdoor unit 8204, the air conditioner can operate with the use of the power storage device 8203 of one embodiment of the present invention as an uninterruptible power source even when electric power cannot be supplied from a commercial power source because of power failure or the like.

Note that although the split-type air conditioner including the indoor unit and the outdoor unit is illustrated in FIG. 26 as an example, the power storage device of one embodiment of the present invention can be used in an air conditioner in which the functions of an indoor unit and an outdoor unit are integrated in one housing.

In FIG. 26, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided in the housing 8301 in FIG. 26. The electric refrigerator-freezer 8300 can receive electric power from a commercial power source or use electric power stored in the power storage device 8304. Thus, the electric refrigerator-freezer 8300 can operate with the use of the power storage device 8304 of one embodiment of the present invention as an uninterruptible power source even when electric power cannot be supplied from a commercial power source because of power failure or the like.

Note that among the electronic devices described above, the high-frequency heating appliances such as microwave ovens, the electric rice cookers, and the like require high electric power in a short time. The tripping of a circuit breaker of a commercial power source in use of the electronic devices can be prevented by using the power storage device of one embodiment of the present invention as an auxiliary power source for making up for the shortfall in electric power supplied from a commercial power source.

In addition, in a time period when electronic devices are not used, specifically when the proportion of the amount of electric power which is actually used to the total amount of electric power which can be supplied from a commercial power source (such a proportion is referred to as power usage rate) is low, electric power can be stored in the power storage device, whereby the power usage rate can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power source; thus, the power usage rate in daytime can be reduced.

The use of a power storage device in vehicles can lead to next-generation clean energy vehicles such as hybrid electric vehicles (HEVs), electric vehicles (EVs), and plug-in hybrid electric vehicles (PHEVs).

Figure 27A:
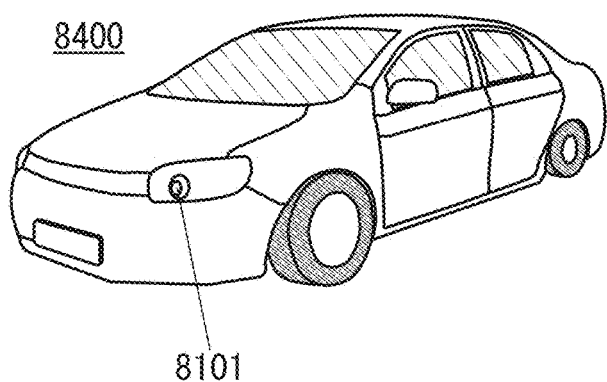
FIGS. 27A and 27B illustrate examples of a vehicle using one embodiment of the present invention.
Figure 27B:
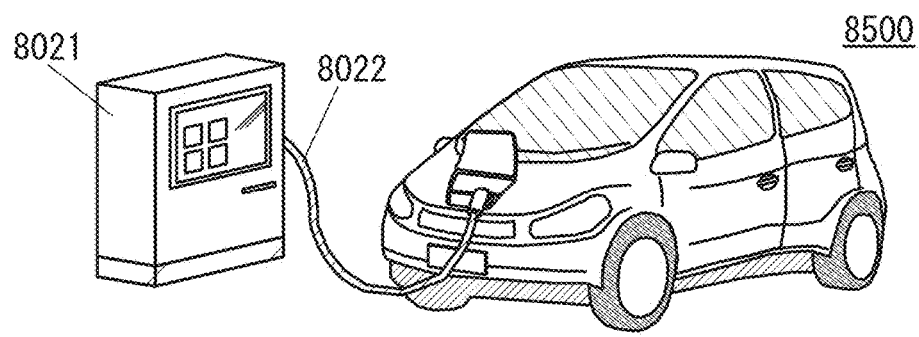

FIGS. 27A and 27B each illustrate an example of a vehicle using one embodiment of the present invention. An automobile 8400 illustrated in FIG. 27A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device included in the automobile 8400, such as a speedometer or a tachometer. Furthermore, the power storage device can supply electric power to a semiconductor device included in the automobile 8400, such as a navigation system.

FIG. 27B illustrates an automobile 8500 including the power storage device. The automobile 8500 can be charged when the power storage device is supplied with electric power through external charging equipment by a plug-in system, a contactless power supply system, or the like. In FIG. 27B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. For example, with the use of a plug-in technique, a power storage device included in the automobile 8500 can be charged by being supplied with electric power from outside. The charging can be performed by converting AC electric power into DC electric power through a converter such as an AC-DC converter.

Although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the automobile stops but also when moves. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Moreover, the power storage device included in the vehicle can be used as a power source for supplying electric power to products other than the vehicle. In that case, the use of a commercial power supply can be avoided at peak time of electric power demand.

This embodiment can be implemented in appropriate combination with any of the other embodiments.

This application is based on Japanese Patent Application serial no. 2013-251373 filed with the Japan Patent Office on Dec. 4, 2013, the entire contents of which are hereby incorporated by reference.

What is claimed is:

1. A power storage unit comprising:
    a positive electrode comprising a positive electrode current collector;
    a negative electrode;
    a separator between the positive electrode and the negative electrode;
    an electrolyte solution;
    a positive electrode lead; and
    an exterior body,
    wherein the positive electrode current collector comprises a positive electrode tab,
    wherein the positive electrode tab comprises a bend portion and a connection region,
    wherein the connection region is electrically connected to the positive electrode lead,
    wherein the positive electrode, the negative electrode, the separator, the bend portion, the connection region, and the electrolyte solution are in the exterior body, wherein the exterior body comprises a surface at least part of which includes alternating projections and depressions,
wherein a first cross-sectional shape of the surface is a wave shape formed by the projections and the depressions,
wherein a second cross-sectional shape of the surface is a closed loop without a seam, and
wherein the bend portion comprises a depression shape and a projection shape.

2. The power storage unit according to claim 1,
wherein at least part of the first cross-sectional shape includes a curve.

3. The power storage unit according to claim 1,
wherein at least part of the first cross-sectional shape includes a straight line.

4. The power storage unit according to claim 1,
wherein the exterior body is a stacked layer of a metal film and a thermoplastic film.

5. The power storage unit according to claim 1,
wherein a pitch of adjacent two of the projections is less than or equal to one tenth of a linear distance of a region in which the positive electrode, the negative electrode, the separator, and the electrolyte solution are provided.

6. The power storage unit according to claim 1,
wherein a height difference between each of the projections and each of the depressions of the exterior body is greater than or equal to five times as large as a thickness of the exterior body.

7. The power storage unit according to claim 1, further comprising a bending point in the exterior body,
wherein a pitch of adjacent two of the projections on an outer side of the bending point is larger than a pitch of other adjacent two of the projections on an inner side of the bending point.

8. An electronic device comprising the power storage unit according to claim 1,
wherein the power storage unit changes in form as a housing of the electronic device changes in form.

9. The power storage unit according to claim 1,
wherein a number of sealed openings of the exterior body is two.

10. The power storage unit according to claim 9, further comprising:
the positive electrode lead exposed from the exterior body through one of the sealed openings; and
a negative electrode lead exposed from the exterior body through the other of the sealed openings.

11. The power storage unit according to claim 1,
wherein the projections and the depressions form bellows structure.

12. A power storage unit comprising:
a positive electrode comprising a positive electrode current collector;
a negative electrode;
a separator between the positive electrode and the negative electrode;
an electrolyte solution;
a positive electrode lead; and
an exterior body
wherein the positive electrode current collector comprises a positive electrode tab,
wherein the positive electrode tab comprises a bend portion and a connection region,
wherein the connection region is electrically connected to the positive electrode lead,
wherein the positive electrode, the negative electrode, the separator, the bend portion, the connection region, and the electrolyte solution are in the exterior body,
wherein the exterior body comprises a surface at least part of which includes bellows structure,
wherein the bellows structure is configured such that the exterior body is shrunk on an inner side of a bending point,
wherein the bellows structure is configured such that the exterior body is stretched on an outer side of the bending point,
wherein the bend portion comprises a depression shape and a projection shape, and
wherein a cross-section of the surface is a closed loop without a seam.

13. The power storage unit according to claim 12,
wherein the bellows structure comprises alternating projections and depressions.

14. The power storage unit according to claim 13,
wherein a cross-sectional shape of the projections and the depressions of the exterior body is a wave shape.

15. An electronic device comprising a housing and the power storage unit according to claim 12,
wherein the power storage unit changes in form as the housing changes in form.

16. The power storage unit according to claim 12,
wherein a number of sealed openings of the exterior body is two.

17. The power storage unit according to claim 16,
wherein the exterior body has the positive electrode lead in one of the sealed openings and has a negative electrode lead in another sealed openings.

18. A power storage unit comprising:
a positive electrode comprising a positive electrode current collector;
a negative electrode;
a separator between the positive electrode and the negative electrode;
an electrolyte solution;
a positive electrode lead; and
an exterior
wherein the positive electrode current collector comprises a positive electrode tab,
wherein the positive electrode tab comprises a bend portion and a connection region,
wherein the connection region is electrically connected to the positive electrode lead,
wherein the positive electrode, the negative electrode, the separator, the bend portion, the connection region, and the electrolyte solution are in the exterior body,
wherein the exterior body comprises a surface at least part of which includes alternating projections and depressions,
wherein a number of sealed openings of the exterior body is two,
wherein the bend portion comprises a depression shape and a projection shape, and
wherein a cross-section of the surface is a closed loop without a seam.

19. The power storage unit according to claim 18,
wherein a cross-sectional shape of the projections and the depressions of the exterior body is a wave shape.

20. The power storage unit according to claim 18,
wherein the exterior body has the positive electrode lead in one of the sealed openings and has a negative electrode lead in another sealed openings.

21. An electronic device comprising a housing and the power storage unit according to claim 18,
   wherein the power storage unit changes in form as the housing changes in form.

* * * * *